United States Patent
Suzaki et al.

(10) Patent No.: US 7,254,345 B2
(45) Date of Patent: Aug. 7, 2007

(54) RECEIVER AND RECEIVING METHOD CAPABLE OF DETECTING AN EYE APERTURE SIZE FORMED BY RECEPTION DATA SIGNALS

(75) Inventors: Tetsuyuki Suzaki, Tokyo (JP); Takashi Kuriyama, Tokyo (JP); Yoshihiro Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 654 days.

(21) Appl. No.: 10/231,174

(22) Filed: Aug. 30, 2002

(65) Prior Publication Data

US 2003/0043440 A1   Mar. 6, 2003

(30) Foreign Application Priority Data

Sep. 3, 2001   (JP) .............................. 2001-265258

(51) Int. Cl.
*H04B 10/06*   (2006.01)

(52) U.S. Cl. ....................... 398/202; 398/206; 398/208; 398/209; 398/210; 398/213; 398/214; 398/25; 398/26; 398/27; 398/155; 375/222; 375/226; 375/326; 375/327; 375/317; 714/704; 714/708; 714/709; 714/712

(58) Field of Classification Search ................ 375/214, 375/316, 222, 226, 326, 327, 317; 714/705, 714/704, 708, 709, 712; 398/202, 206, 208, 398/213, 209, 210, 214, 25, 26, 27, 155
See application file for complete search history.

(56) References Cited

U.S. PATENT DOCUMENTS 3,736,414 A * 5/1973 McAuliffe ................... 708/322
4,823,360 A * 4/1989 Tremblay et al. ........... 375/214
5,896,392 A * 4/1999 Ono et al. ................... 714/705
6,694,273 B2 * 2/2004 Kurooka et al. .............. 702/69
6,735,259 B1 * 5/2004 Roberts et al. .............. 375/316

FOREIGN PATENT DOCUMENTS

| JP | 59-74756 | 4/1984 |
|---|---|---|
| JP | 61-7714 | 1/1986 |
| JP | 04-54043 | 2/1992 |
| JP | 07-15355 | 1/1995 |
| JP | 08-256093 | 10/1996 |
| JP | 08-265375 | 10/1996 |
| JP | 09-64920 | 3/1997 |
| JP | 10-500830 | 1/1998 |

OTHER PUBLICATIONS

Japanese Office Action dated Mar. 9, 2005, with partial English translation.

* cited by examiner

*Primary Examiner*—Hanh Phan
(74) *Attorney, Agent, or Firm*—McGinn IP Law Group, PLLC

(57) ABSTRACT

In a receiver operable in response to a data signal, an eye aperture size is detected along a time axis by an eye aperture detection circuit and is controlled by a control circuit so that it becomes a maximum. The eye aperture detection circuit determines different decision time points of the same level arranged along a time axis and judges whether or not an error is caused to occur at each of the decision time points, so as to detect the eye aperture size and to produce detection results. The control circuit processes the detection results in accordance with a predetermined algorithm to successively vary the eye aperture size and to keep the data signal at an optimum amplitude.

36 Claims, 13 Drawing Sheets

RECEIVER AND RECEIVING METHOD CAPABLE OF DETECTING AN EYE APERTURE SIZE FORMED BY RECEPTION DATA SIGNALS

BACKGROUND OF THE INVENTION

This invention relates to an optical receiver and an optical receiving method for use in receiving a sequence of data signal. Herein, it has been noted throughout the instant specification that this invention may be applicable to any other receivers and receiving method than the optical receiver and optical receiving method, although the following description will be mainly restricted to the optical receiver and the optical receiving method.

Recent expectations have been directed to an optical transmission system that can transmit a large amount of data signals at a high speed. A wide variety of applications have been considered about the optical transmission system. In such an optical system, an optical amplifier and a wavelength division multiplex (WDM) technique have been often used to establish a high speed transmission.

However, the above-mentioned optical transmission system is disadvantageous in that a received wave-form is liable to be distorted due to various degradation factors increased in number in comparison with any other conventional optical transmission systems, although the former make it possible to transmit the data signals at a high speed as compared with the latter.

For example, the optical transmission system very often includes, as the optical amplifier, an optical fiber amplifier formed by an optical fiber. Such an optical transmission system has, as the degradation factors of the waveform, noise resulting from amplified spontaneous emission (ASE) generated by the optical fiber amplifier and dispersion of an optical fiber. In addition, the waveform distortion also takes place in the optical transmission system due to a nonlinear effect and a cross talk from an adjacent channel in the WDM. Especially, the waveform distortion resulting from the nonlinear effect becomes serious with an increase of optical signal power in the optical fiber.

Heretofore, an optical receiver included in the above-mentioned optical transmission system usually has a clock and data recovery circuit for recovering or regenerating the data signals at a predetermined threshold level. However, a CDR of this type can not always correctly discriminate or regenerate the data signals deteriorated in waveform due to the dispersion of the optical fiber, and the like.

Alternatively, a proposal has been also made about a clock and data recovery circuit that has a function of adjusting a threshold level of the data signals to an optimum level. This circuit can correctly discriminate the data signals deteriorated in waveform and will be called a clock and data recovery circuit (CDR) with a threshold level adjusting function.

However, the CDR with the threshold level adjusting function optimizes only the threshold level of the data signals but can not compensate for waveform distortion or degradation itself. This shows that the CDR mentioned above has a limit to correctly regenerate the data signals.

SUMMARY OF THE INVENTION

It is an object of this invention to provide a receiver which can compensate for a waveform itself to correctly regenerate data signals.

It is another object of this invention to provide an optical receiver which is suitable for an optical transmission system that uses an optical amplifier and a WDM technique.

It is still another object of this invention to provide a receiver circuit that is applicable to the above-mentioned receiver and optical receiver and which can detect an eye aperture size of an eye pattern to compensate for a waveform degradation.

It is yet another object of this invention to provide a method of receiving a sequence of data signals, which can carry out control operation such that an eye aperture size becomes a maximum.

It is another object of this invention to provide a program which is used in the receiver or the optical receiver to carry out control operation such that the eye aperture size becomes a maximum.

An optical receiver according to a first aspect of this invention is operable in response to a light signal and comprises a clock and data recovery circuit (CDR) for recovering a sequence of clocks and a sequence of data signals in response to an intermediate data signal obtained from the light signal, with reference to a threshold control signal used for recovering the data signal sequence and a controller, responsive to the intermediate data signal and the threshold control signal, for detecting an eye pattern of the intermediate data signal to monitor an eye aperture of the eye pattern and to control an eye aperture size.

According to a second aspect of this invention, the optical receiver mentioned in the first aspect further comprises a photoelectric converter for converting the light signal sequence into an electric signal and a waveform equalizer, responsive to the electric signal and an internal control signal, for reshaping a waveform of the electric signal into a waveform-shaped signal in accordance with the internal control signal to supply the waveform-shaped signal to the clock and data recovery circuit as the intermediate data input signal. The controller produces an eye control signal for controlling the eye aperture size and supplying the waveform equalizer with the eye control signal as the internal control signal.

According to a third aspect of this invention, the controller of the optical receiver mentioned in the second aspect comprises an eye aperture detection circuit, responsive to the intermediate data signal and the threshold control signal, for detecting the eye aperture size to produce a result of detection as a detection signal representative of the result of detection and a processing circuit for processing the detection signal to supply the eye control signal to the waveform equalizer so that the eye aperture is widened.

According to a fourth aspect of this invention, the eye aperture detection circuit of the optical receiver mentioned in the third aspect comprises a level adjustment circuit for adjusting the threshold control signal into a reference level signal and a decision circuit for discriminating the eye aperture size on the basis of the reference level signal at a first decision time point and at second and third decision time points preceding and following the first decision time points, respectively, arranged along a time axis to produce first through third ones of the results of detection at the first through the third decision time points as the detection signal.

According to a fifth aspect of this invention, the processing circuit of the optical receiver mentioned in the third aspect controls the eye aperture size in accordance with an algorithm that defines a relationship between each amplitude of the intermediate data signal and the eye aperture size.

According to a sixth aspect of this invention, the algorithm uses a variation of the eye aperture size that appears when an amplitude of a single bit delayed data signal is varied by a unit quantity.

According to a seventh aspect of this invention, the algorithm determines an amplitude position corresponding to a maximum one of the eye aperture size, with reference to the variation of the eye aperture size appearing when the amplitude is varied by a unit quantity.

According to an eighth aspect of this invention, the algorithm is such that the amplitude position corresponding to the maximum eye aperture size is determined by successively varying the amplitude by the unit quantity.

According to a ninth aspect of this invention, the algorithm is such that, when the eye aperture size is changed from an increase to a decrease, the amplitude is changed by a variation quantity greater than the unit quantity to be returned back to a previous amplitude and is then varied by the unit quantity.

According to a tenth aspect of this invention, the algorithm is such that, when the eye aperture size is changed from an increase to a decrease, the unit quantity that is indicative of the variation of the amplitude is inverted in polarity.

According to an eleventh aspect of this invention, a receiver is responsive to a sequence of data signals specified by an eye pattern to produce a sequence of output data signals representative of reproductions of the data signals and comprises an eye aperture detection circuit for detecting an eye aperture size in the eye pattern from the data signal sequence to produce a detection signal representative of a result of detection and a processing circuit for processing the detection signal to produce a control signal for controlling the eye aperture size.

According to a twelfth aspect of this invention, the receiver mentioned in the eleventh aspect further comprises a waveform equalizer for reshaping the data signal sequence into a sequence of waveform-shaped signals to supply the wave-formed shaped signals to the eye aperture detection circuit. The control signal is supplied from the control circuit to the waveform equalizer as an internal control signal while the waveform equalizer delays the data signal sequence in response to the internal control signal and shapes the data signal sequence.

According to a thirteenth aspect of this invention, the waveform equalizer mentioned in the twelfth aspect comprises a delay circuit for delaying the data signal sequence by a single bit to produce a sequence of single bit delayed data signals, a variable gain amplifier, responsive to the single bit delayed data signals and the internal control signal, for controlling a gain in accordance with the internal control signal to produce a sequence of gain controlled data signals, and a subtracter for subtracting the gain controlled data signal sequence from the data signal sequence.

According to a fourteenth aspect of this invention, the eye aperture detection circuit mentioned in the eleventh aspect comprises regenerating means, which has a plurality of decision time points arranged at time points different from one another along a time axis, for regenerating whether or not each decision time point is located within the eye aperture to produce regenerated results at the respective decision time points, and a control circuit for controlling time positions of the decision time points in response to the regenerated results.

According to a fifteenth aspect of this invention, the regenerating means mentioned in the fourteenth aspect has, as the decision time points, a center time point to be placed along the time axis at a center of the eye aperture and two time points preceding and following the center time point. The control circuit produces delay control signals for controlling the time positions of the two time points preceding and following the center time point in response to the regenerated results.

According to a sixteenth aspect of this invention, the regenerating means mentioned in the fourteenth aspect comprises variable delay time means, responsive to the delay control signal, for varying delay times of clocks to produce delayed clocks, a plurality of discriminators for regenerating the data signals at the decision time points determined by the clocks and the delayed clocks to produce regenerated signals representative of the regenerated results to supply the processing circuit with regenerated signals at the respective time points.

According to a seventeenth aspect of this invention, the processing circuit is supplied as the regenerated results with the time delay control signals and processes the delay control signals in accordance with a predetermined algorithm to produce the control signal such that the eye aperture size of the data signals becomes a maximum.

According to an eighteenth aspect of this invention, the predetermined algorithm mentioned in the seventeenth aspect utilizes a variation of the eye aperture size that appears when the amplitude of the single bit delayed data signals are varied by a unit quantity.

According to a nineteenth aspect of this invention, the predetermined algorithm mentioned in the eighteenth aspect determines an amplitude position of a maximum eye aperture size from a variation of the eye aperture size corresponding to a variation of the unit quantity of the amplitude.

According to a twentieth aspect of this invention, the predetermined algorithm mentioned in the nineteenth aspect is such that the maximum amplitude position of the eye aperture size is calculated by successively varying the amplitude by the unit quantity.

According to a twenty-first aspect of this invention, the predetermined algorithm mentioned in the nineteenth aspect is such that, when the eye aperture size is changed from an increase to a decrease, the variation of the amplitude is changed by a variation quantity greater than the unit quantity to be returned back to a previous amplitude and is then varied by the unit quantity.

According to a twenty-second aspect of this invention, the algorithm mentioned in the nineteenth aspect is such that, when the eye aperture size is changed from an increase to a decrease, the unit quantity that is indicative of a unit variation of the amplitude is inverted in polarity.

According to a twenty-third aspect of this invention, an eye aperture detection circuit is operable in response to a sequence of data signals specified by an eye pattern and comprises a receiving circuit for receiving the data signal sequence and an eye aperture size detector for detecting an eye aperture size of the eye pattern along a time axis in response to the data signal sequence received by the receiving circuit.

According to a twenty-fourth aspect of this invention, the eye aperture detector in the twenty-third aspect comprises a discriminator, responsive to the data signal sequence and clocks synchronized with the data signal sequence, for regenerating the data signal sequence at time points of the clocks to produce first regenerated results, a pair of discriminators for regenerating the data signal sequence at time points preceding and following those of the clocks to produce second and third regenerated results, respectively a logical circuit for carrying out logical operation of the first through the third regenerated results given from the above-mentioned discriminators to produce logical operation results, and a control circuit for detecting the eye aperture size in response to the logical operation results.

According to a twenty-fifth aspect of this invention, the control circuit mentioned in the twenty-fourth aspect produces time delay control signals corresponding to time positions adjacent to edges of the eye aperture.

According to a twenty-sixth aspect of this invention, the eye aperture detector mentioned in the twenty-fifth aspect further comprises variable delay circuits for delaying the clocks in response to the time delay control signals.

According to a twenty-seventh aspect of this invention, a method is for use in receiving a sequence of data signals specified by an eye pattern and comprising the steps of stepwise varying an amplitude of the data signal sequence in a selected one of an increase direction and a decrease direction, successively detecting an eye aperture size of the eye pattern at each amplitude varied, and controlling the eye aperture size so as to maximize the same.

According to a twenty-eighth aspect of this invention, the eye aperture size controlling step comprises the steps of detecting a reduction of the eye aperture size while the amplitude is varied in the selected direction and changing the selected direction to a reverse direction on detection of the reduction of the eye aperture, to thereby control the eye aperture size so that it becomes a maximum.

According to a twenty-ninth aspect of this invention, the eye aperture size controlling step comprises the steps of detecting a reduction of the eye aperture size while the amplitude is varied in the selected direction, changing the amplitude by plural times of a unit quantity in a direction reverse to the selected direction, on detection of the reduction of the eye aperture, and then monotonically and stepwise changing the amplitude by the unit quantity in the selected direction so that the eye aperture size becomes a maximum.

According to a thirteenth aspect of this invention, the receiver mentioned in any one of the first through the tenth aspects uses a clock and data recovery circuit (CDR) that has a function of recovering the data signal sequence at a threshold level which is adjusted to an optimum level and which is produced as the threshold control signal.

According to a thirty-first aspect of this invention, a program is for use in receiving, in a receiver, a sequence of data signals specified by an eye pattern. The program comprises the steps of stepwise varying an amplitude of the data signal sequence by a unit quantity in a selected one of an increase direction and a decrease direction, successively detecting an eye aperture size of the eye pattern at each amplitude varied, and controlling the eye aperture size so as to maximize the same.

DESCRIPTION OF THE PREFERRED EMBODIMENTS

Figure 1:
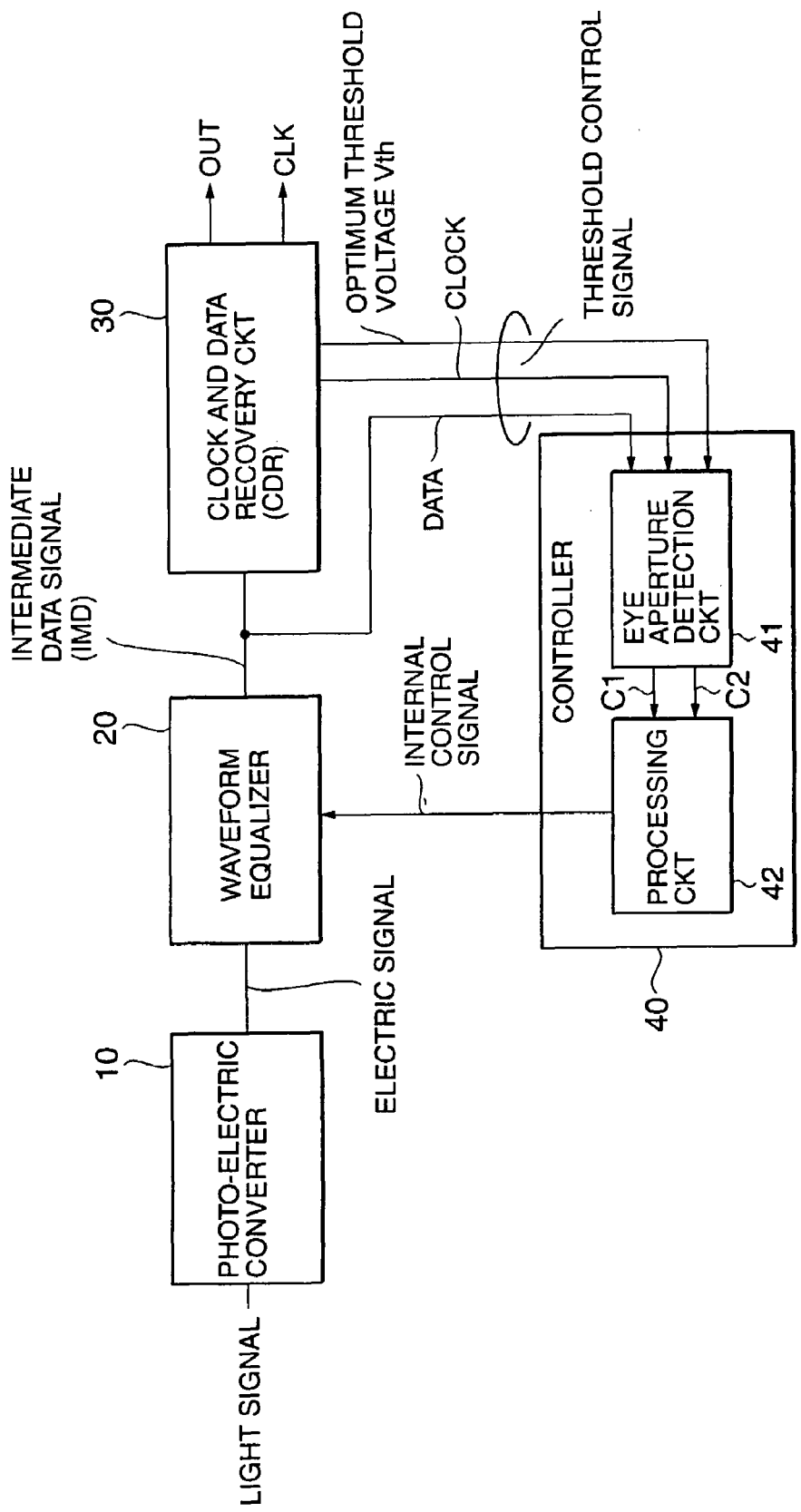
FIG. 1 is a schematic block diagram of an optical receiver according to this invention.

Referring to FIG. 1, an optical receiver according to a first embodiment of this invention has a photoelectric converter 10 which converts a light signal into an electric signal that is amplified to a predetermined amplitude level by an optical amplifier formed, for example, an optical fiber. An amplified electric signal is produced from the photoelectric converter 10 as a sequence of digital signals. The electric signal is delivered from the photoelectric converter 10 to a waveform equalizer 20 which shapes a waveform of the electric signal in a manner to be described later. At any rate, the waveform equalizer 20 produces a waveform-shaped signal as an intermediate data signal IMD and supplies the intermediate data signal IMD to both a clock and data recovery circuit (CDR) 30 and a controller 40.

The illustrated CDR 30 is operable to discriminate or regenerate the intermediate data signal IMD with reference to a discrimination level or voltage to supply a sequence of output data signals OUT and a sequence of clocks CLK to an external circuit (not shown). In addition, the CDR 30 also has a function of adjusting or controlling the discrimination level or voltage to an optimum threshold level or voltage Vth. In this connection, the discrimination voltage of the illustrated CDR 30 may be called a controllable discrimination voltage or signal and is adjusted to the optimum threshold voltage Vth by the illustrated CDR 30. Such an optimum threshold voltage Vth is sent to the controller 40 as a threshold control signal representative of the optimum threshold voltage.

Thus, the controller 40 is given the intermediate data signal IMD, the optimum threshold voltage (threshold control signal) Vth, and the clocks CLK to sweep the intermediate data signal IMD along a time axis in synchronism with the clocks CLK and to consequently form an eye pattern. Herein, it is to be noted that the eye pattern has an eye aperture opened along the time axis and expanded in an amplitude direction. The illustrated controller 40 is operable to detect a size of the eye aperture, namely, an eye aperture size with reference to the optimum threshold voltage Vth and to control the eye aperture so that it becomes a maximum size in a manner to be mentioned later.

Specifically, the controller 40 has an eye aperture detector 41 and a processing circuit 42. In this event, the eye aperture detector 41 detects the eye aperture size along the time axis and produces first and second size signals C1 and C2 which correspond to the eye aperture size and which may be called first and second delay time control signals, as will become clear later. At any rate, the first and the second delay time control signals serve to control the eye aperture size and may be collectively called an eye control signal.

The processing circuit 42 processes the first and the second size signals C1 and C2 to supply the waveform equalizer 20 with an internal control signal representative of a result of processing.

The waveform equalizer 20 is given the electric signal and the internal control signal from the photoelectric converter 10 and the controller 40, respectively. In this event, the photoelectric converter 10 is structured by a variable dispersion equalizer. The waveform equalizer 20 adjusts the electric signal to compensate for a distortion of the waveform resulting from cross talk in accordance with the internal control signal. In other words, the illustrated waveform equalizer 20 serves to control the dispersion characteristic of the photoelectric converter 10 in response to the internal control signal sent from the processing circuit 42.

Now, description will be directed to the eye aperture detection circuit 41 for a better understanding of this invention. The eye aperture detection circuit 41 schematically samples the eye aperture at a predetermined level along the time axis to measure the eye aperture size along the time axis and to detect variation of the eye aperture size. The eye aperture detection circuit 41 may be structured by comparators, discriminators, Exclusive OR circuits, and so on and also comprises a control circuit for controlling delay times and delay circuits for delaying clocks given to the discriminators, as will be described later in detail.

In any event, the illustrated eye aperture detection circuit 41 measures the eye aperture size by detecting whether or not the predetermined level falls within the eye aperture at a center time point of the eye aperture and at two time points preceding and following the center time point. In other words, the predetermined level at each of the center time point and the two time points defines a center time point level and preceding and following time point levels, respectively.

In the illustrated example, when the preceding and the following time point levels are judged to fall outside of the eye aperture, the processing circuit 42 controls the preceding and the following time points so that they are shifted towards the center time point and are near to the center time point. On the other hand, when the preceding and the following time point levels are judged to fall within the eye aperture, the processing circuit 42 carries out shift control operation such that the preceding and the following time points are remote from the center time point.

By carrying out the above-mentioned control operation, the controller 40 detects the eye aperture size and controls the eye aperture size so that the eye aperture becomes a maximum. Thus, the controller 40 can remove a waveform distortion and the like resulting from the cross talk.

Figure 2:
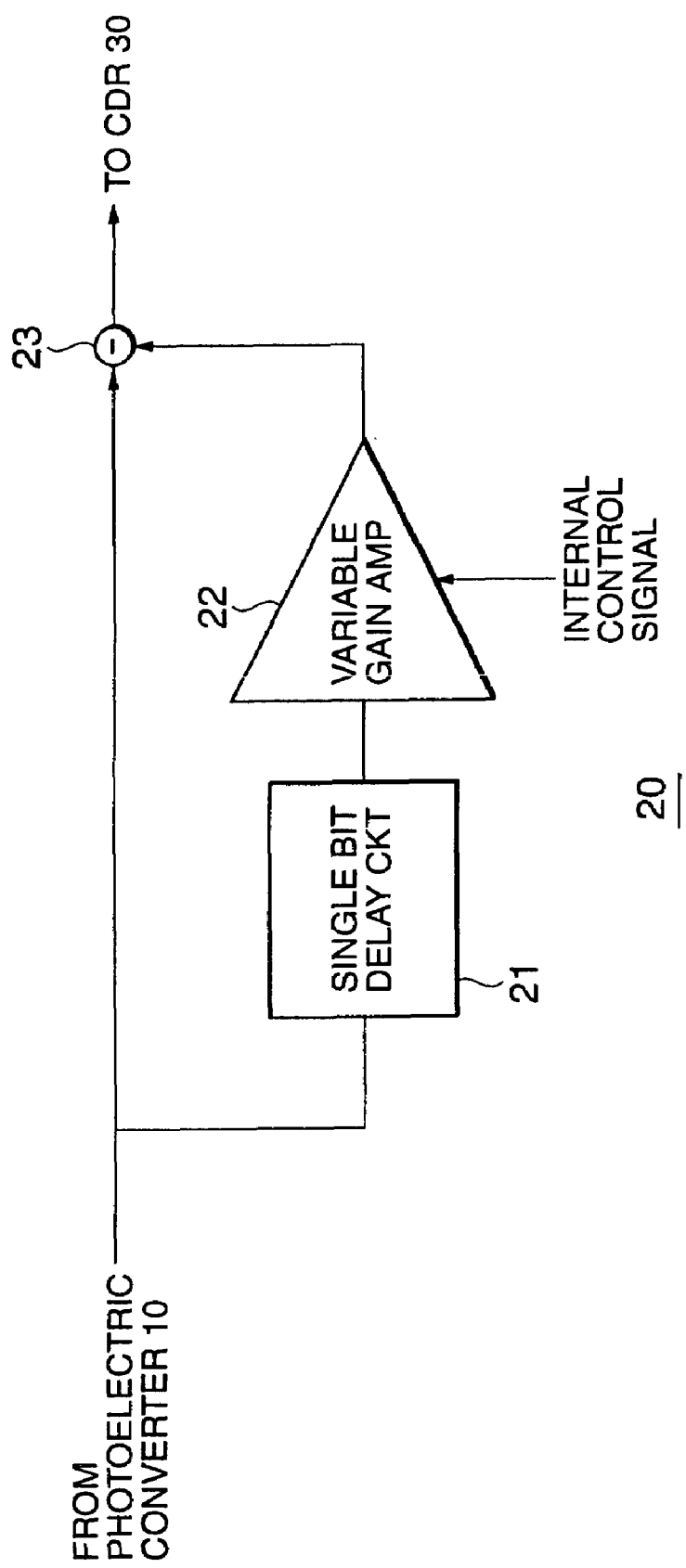
FIG. 2 is a block diagram of a waveform equalizer used in the optical receiver illustrated in FIG. 1.

Referring to FIGS. 1 and 2, operation of the optical receiver illustrated in FIG. 1 will be described more in detail. As mentioned in FIG. 1, the light signal is given as a light data signal to the photoelectric converter 10 to be converted into the electric signal which is amplified to the predetermined amplitude by the photoelectric converter 10, as mentioned before. The electric signal is sent to the waveform equalizer 20. Briefly, the waveform equalizer 20 shapes the waveform of the electric signal so that the eye aperture becomes a maximum in size to produce the intermediate data signal IMD waveform-shaped. The intermediate data signal IMD is sent to the clock and data recovery circuit (CDR) 30 with the function of adjusting the threshold voltage, as mentioned before. As a result, the clock and data recovery circuit (CDR) usually regenerates the intermediate data signal IMD at the optimum threshold level to reproduce or regenerate the intermediate data signal IMD into the data signal sequence that is produced as a sequence of output signals.

The waveform equalizer 20 illustrated in FIG. 2 has a single bit (one bit) delay circuit 21 and a variable gain amplifier 22 operable in response to the internal control signal sent from the controller 40 (FIG. 1). The single bit delay circuit 21 serves to delay the electric signal given from the photoelectric converter 10 by a single bit and to produce a delayed signal delayed by the single bit. The variable gain amplifier 22 controls an amplitude of the delayed electric signal in response to the internal control signal delivered from the controller 40 (FIG. 1). The amplitude controlled and delayed electric signal is sent to a subtracter 23 which is directly given the electric signal from the photoelectric converter 10.

Under the circumstances, the subtracter 23 subtracts the amplified and delayed electric signal from the electric signal which may be referred to as a non-delayed data signal or a primary data signal.

More specifically, the illustrated waveform equalizer 20 is supplied from the photoelectric converter 10 with the electric signal composed of the data signal sequence. The data signal sequence is directly delivered to the subtracter 23 on one hand and is given to the single bit delay circuit 21 on the other hand. The single bit delay circuit 21 delays the data signal sequence by one bit to supply the variable gain amplifier 22 with the delayed data signal sequence. As mentioned before, the illustrated variable gain amplifier 22 is given the internal control signal from the controller 40 and varies its gain in accordance with the internal control signal. Therefore, the amplitude controlled and delayed electric signal is supplied as the delayed data signal to the substracter 23. Responsive to the primary data signal, the subtracter 23 shapes the waveform of the primary data signal into the waveform-shaped signal by subtracting the delayed data signal from the primary data signal. The waveform-shaped data signal is supplied to the CDR 30 and the controller 40, as shown in FIG. 1.

Figure 3:
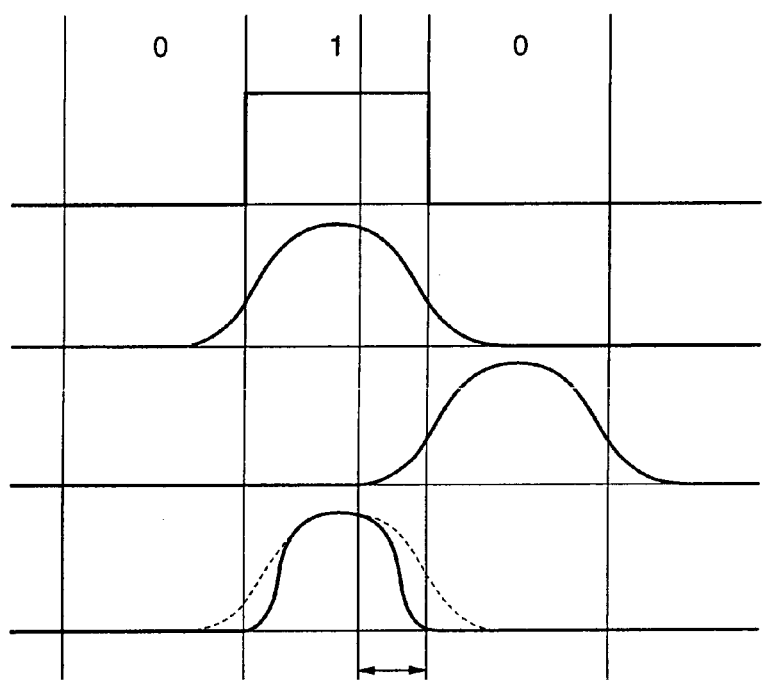
FIGS. 3A through 3D show waveforms for use in describing an operation of the waveform equalizer illustrated in FIG. 2.

Referring to FIG. 3, description will be made about a waveform reshaping operation executed by the waveform equalizer 20. At first, it is to be noted that each data signal, namely, each original data signal is generated at every one of bits and originally has a waveform of a rectangular shape, as illustrated in FIG. 3A. However, such a rectangular original data signal is inevitably distorted or deformed in waveform due to dispersion and nonlinearity of an optical fiber, a cross talk from adjacent channels in the wavelength division multiplex, and so on. As a result, the rectangular original data signal is distorted into a distorted waveform, as shown in FIG. 3B. The distorted waveform has a front component and a rear one forwardly and backwardly extended from a center region and is received by the optical receiver illustrated in FIG. 1. When a light signal of such a distorted waveform is converted into an electric signal by the photoelectric converter 10, such an electric signal, namely, a sequence of data signals has a waveform such that an inter-symbol interference is caused to occur on forward and backward bits adjacent to a current bit. Such a waveform subjected to the inter-symbol interference is delivered to the waveform equalizer 20 illustrated in FIG. 2. In this event, reshaping the waveform subjected to the inter-symbol interference without any processing reduces an eye aperture in size and brings about a decrease of a margin of each decision time point.

Taking the above into account, the waveform equalizer 20 illustrated in FIG. 2 executes the above-mentioned operation. Specifically, when the data signal shown in FIG. 3B is received, the subtracter 23 subtracts the single bit delayed data signal (FIG. 3C) from the data signal (FIG. 3B). Such subtraction results in partially scraping the waveform (FIG. 3B) into a waveform (FIG. 3D) from which the inter-symbol interference is removed. A scraping amount of the waveform can be adjusted by controlling a gain of the variable gain amplifier 22 by the internal control signal sent from the controller 40. Thus, control operation is executed by the controller 40 shown in FIG. 1 so that the eye aperture size becomes a maximum.

Figure 4:
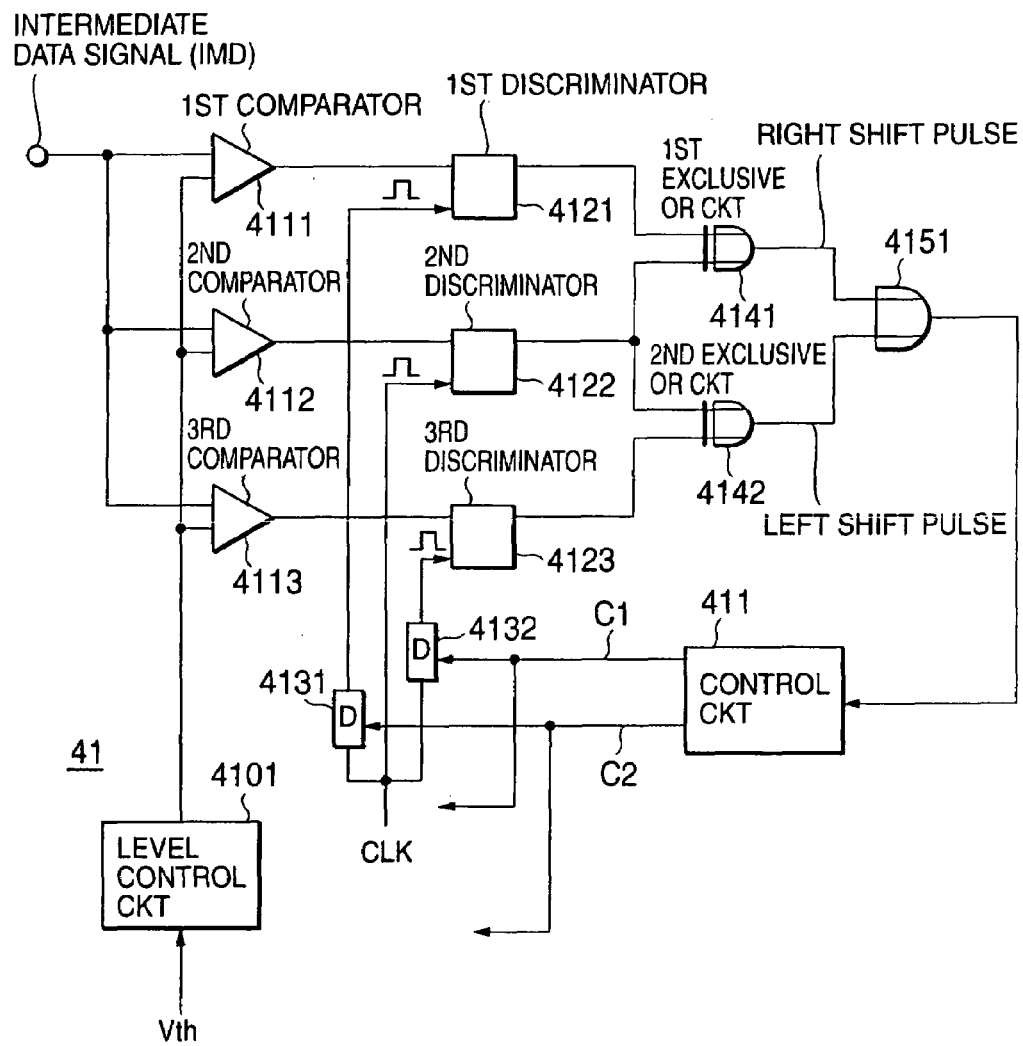
FIG. 4 is a block diagram of an eye aperture detection circuit illustrated in FIG. 1.

Referring to FIGS. 4 through 6, description will be made about the eye aperture detection circuit 41 included in the controller 40. In FIG. 4, the eye aperture detection circuit 41 is supplied from the CDR 30 with the clocks CLK and the threshold control signal. The threshold control signal is given as the optimum threshold voltage Vth, as described before. In addition, the intermediate data signal IMD is also supplied to the eye aperture detection circuit 41 from the waveform equalizer 20 mentioned before.

As illustrated in FIG. 4, the optimum threshold voltage Vth is supplied to a level control circuit 4101 of the eye aperture detection circuit 41. The level control circuit 4101 shifts or offsets the optimum threshold voltage Vth by a difference voltage ($\Delta v$) to produce a reference voltage of (Vth–$\Delta v$). This shows that the illustrated level control circuit 4101 serves to produce, as an output voltage, the reference voltage (Vth–$\Delta v$) lower than the optimum threshold voltage Vth.

The reference voltage (Vth–$\Delta v$) is delivered to first, second, and third comparators 4111 to 4113 all of which are supplied with the intermediate data signal IMD in common and which are operable as a receiving circuit of the intermediate data signal IMD. The first through the third comparators 4111 to 4113 compare the intermediate data signal IMD with the reference voltage (Vth–$\Delta v$) to supply first through third discriminators 4121 to 4123 with first through third results of comparison, respectively. The first through the third results of comparison are given to the first through the third discriminators 4121 to 4123 as first through third result signals or regenerated signals, respectively.

As shown in FIG. 4, the clocks CLK are given to the illustrated eye aperture detection circuit 41 from the CDR 30 (FIG. 1). In the illustrated example, the clocks CLK are supplied direct to the second discriminator 4122 and are delivered to the first and the third discriminators 4121 and 4123 through first and second variable delay circuits 4131 and 4132, respectively. The first and the second variable delay circuits 4131 and 4132 can vary delay times in response to the first and the second delay time control signals C1 and C2 given as the size control signals from a control circuit 411.

The first and the second variable delay circuits 4131 and 4132 delay the clocks CLK in response to the first and the second delay time control signals C1 and C2 representative of delay times. In consequence, the clocks CLK are delayed by delay times indicated by the first and the second delay time control signals C1 and C2 and delivered to the first and the third discriminators 4121 and 4123, respectively. The first through the third discriminators 4121 to 4123 discriminate or regenerate the first through the third result or regenerated signals at time points which are designated by the clocks CLK and the delayed clocks delayed by the above-mentioned delay times and which are different along a time axis from one another. In the illustrated example, it is assumed that the delayed clocks sent through the first and the second variable delay circuits 4131 and 4132 define the time points preceding and following the time points defined by the clocks CLK, respectively. In addition, it is also assumed that the time points defined by the clocks CLK and the delayed clocks provide regenerating timing, respectively. Moreover, it is readily possible to provide the time point preceding the clocks CLK by selecting the delay times of the first and the second variable delay circuits 4131 and 4132 and/or by delaying the clocks CLK by another delay circuit (not shown) having delay times different from those of the first and the second variable delay circuits 4131 and 4132.

At any rate, the first through the third discriminators 4121 to 4123 regenerate the intermediate data signal to obtain first through third results of detection and to produce, as the results of detection, first through third regenerated signals regenerated at the different regenerating timing, namely, first through third time points. In other words, the first through the third discriminators 4121 to 4123 sample an eye pattern at different regenerating timing along the time axis to produce a logic "1" as a regenerated result when each sampling time point, namely, decision time point falls within the eye pattern. To the contrary, each discriminator 4121 to 4123 produces a logic "0" when the decision time point is located outside of the eye pattern. The regenerated results of the first and the second discriminators 4121 and 4122 are sent to a first Exclusive OR circuit 4141 while the regenerated results of the second and the third discriminators 4122 and 4123 are sent to a second Exclusive OR circuit 4142.

According to this structure, the logic "1" is generated from the first Exclusive OR circuit 4141 when noncoindence takes place between the regenerated results of the first and the second discriminators 4121 and 4122. This shows that the regenerated result at the preceding time point is not coincident with the regenerated result at the clock timing.

When noncoincidence takes place between the regenerated results of the second and the third discriminators 4122 and 4123, the logic "1" is generated from the second Exclusive OR circuit 4142. This shows that the regenerated result at the clock timing is not coincident with that at the following time point. Thus, generating the logic "1" by either the first Exclusive OR circuit 4141 or the second Exclusive OR circuit 4142 shows that either the first discriminator 4121 or the third discriminator 4123 regenerates the comparison results from the comparator 4111 or 4131 outside of the eye aperture.

Output signals from the first and the second Exclusive OR circuits 4141 and 4142 are supplied to the control circuit 411 through an OR circuit 4151. The first and the second Exclusive OR circuits 4141 and 4142 and the OR circuit 4151 may be collectively referred to as a logical circuit. In the illustrated example, the logic "1" from the first Exclusive OR circuit 4141 is given to the control circuit 411 as a pulse such that the regenerating timing of the first discriminator 4121 approaches clock timing at the center position along the time axis. The logic "1" from the second Exclusive OR circuit 4142 is given to the control circuit 411 as a pulse such that the regenerating timing of the third discriminator 4143 approaches the clock timing at the center position along the time axis.

Thus, the control circuit 411 is given the regenerated results, as mentioned above, and detects the eye aperture size along the time axis from the regenerated results. Moreover, the illustrated control circuit 411 varies the delay times of the first and the second variable delay circuits 4131 and 4132 to control the decision time points leftwards or rightwards and to position them within the eye aperture.

Figure 5A:
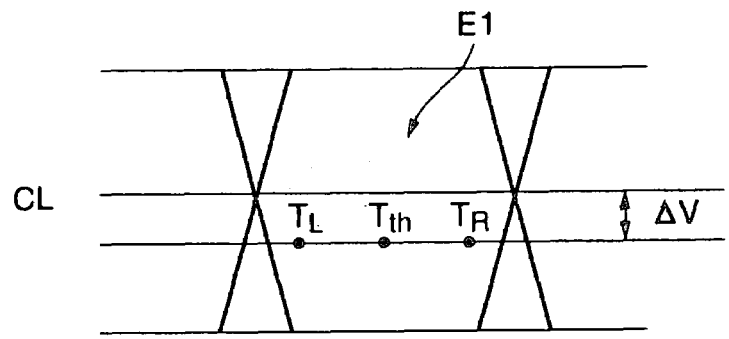
FIGS. 5A and 5B show eye patterns for use in describing the eye aperture detection circuit illustrated in FIG. 4.

Referring to FIGS. 5 and 6, operation of the eye aperture detection circuit 41 will be described more in detail. Each eye pattern illustrated in FIGS. 5 and 6 takes a time axis drawn from a left-hand side to a right-hand side and a level drawn in a perpendicular direction of the figures. In FIG. 5, a center level CL is drawn in a middle of the perpendicular direction while a threshold level is drawn on the lower side of the center level CL. Three decision time points, namely, a left decision time point TL, a center decision time point Tth, and a right decision time point TR are placed along the threshold level, as shown in FIG. 5A. A difference between the center level CL and the threshold level corresponds to the above-mentioned difference or offset voltage ($\Delta v$) while the three decision time points TL, Tth, and TR correspond to the decision time points (clock timing) of the first through the third discriminators 4121 to 4123, respectively. Specifically, the left decision time point TL, the center decision time point Tth, and the right decision time point TR are coincident with the decision time points given to the first through the third discriminators 4121, 4122, and 4123, respectively.

As shown in FIG. 5A, when the eye pattern is normally opened, the three decision time points TL, Tth, and TR are all located within an eye aperture E1 of the eye pattern. In FIG. 4, the first through the third comparators 4111 to 4113 compare the intermediate data signal IMD with the reference voltage (Vth−$\Delta v$) to supply the comparison results to the first through the third discriminators 4121 to 4123, respectively. Since the left, the center, and the right decision time points TL, Tth, and TR are all placed within the eye aperture E1 in FIG. 5A, the regenerated results at TL, Tth, and TR are coincident with one another. The resultant output signals of the first and the second Exclusive OR circuits 4141 and 4142 are kept at the logic "0". As a result, the control circuit 411 keeps the delay control signals C1 and C2 invariable and the decision time points TL, Tth, and TR of the first through the third discriminators 4121 to 4123 are kept intact.

Figure 5B:
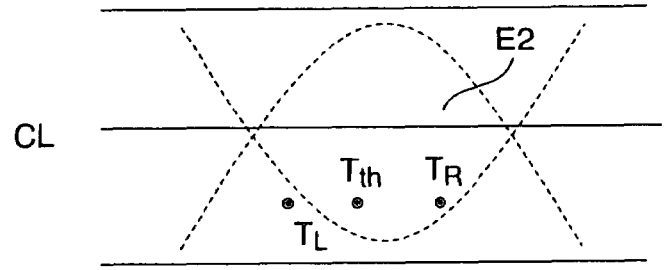

On the other hand, let either one of the decision time points TL and TR be located outside of the eye aperture due to that distortion of an eye pattern which arises from waveform degradation. In this event, the eye aperture detection circuit 41 shown in FIG. 4 changes the left or the right decision time point TL or TR along the time axis. For example, it is assumed that the left decision time point TL does not fall within an eye aperture E2, as shown in FIG. 5B, and that the regenerated results of the first and the second discriminators 4121 and 4122 are not coincident with each other. In this situation, the right decision time point TR falls within the eye aperture E2. This brings about coincidence of the regenerated results of the second and the third discriminators 4122 and 4123. Under the circumstances, the first Exclusive OR circuit 4141 produces the logic "1" as an error pulse while the second Exclusive OR circuit 4142 produces the logic "0".

Thus, when either one of the left and the right decision time points TL and TR is placed outside of the eye aperture and is not coincident with the eye aperture, the error pulse which is representative of the noncoincidence is sent from either the first Exclusive OR circuit 4141 or the second Exclusive OR circuit 4142. Responsive to the error pulse, the control circuit 411 supplies the first and the second delay time control signals C1 and C2 to the first and the second delay circuits 4131 and 4132 to control or vary their delay times. Such varying the delay times is repeated until the error pulse disappears from both the first and the second Exclusive OR circuits 4141 and 4142. In other words, this operation is carried out so that intervals between the left and the center decision time points TL and Tth and between the center and the right decision time points Tth and TR are shortened, as illustrated in FIG. 6B.

Figure 6A:
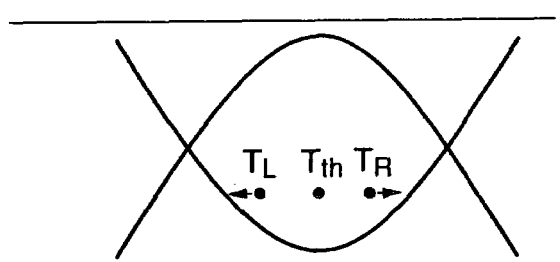
FIGS. 6A and 6B show eye patterns for use in describing operation of the eye aperture detection circuit illustrated in FIG. 4.
Figure 6B:
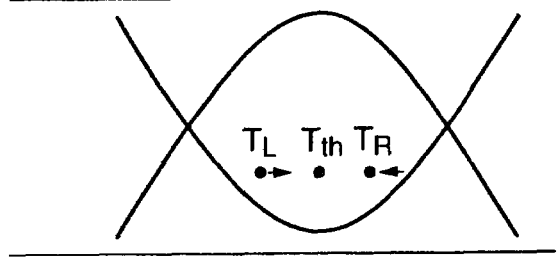

Once the first and the second Exclusive OR circuits 4141 and 4142 fail to detect any error pulse, the control circuit 411 carries out control operation such that the above-mentioned intervals become wide, as shown in FIG. 6A, by controlling the delay times of the first and the second delay circuits 4131 and 4132. As a result of this control operation, the left and the right decision time points TL and TR always remain at positions close to an edge portion of the eye aperture.

Moreover, the illustrated control circuit 411 can detect the eye aperture size by measuring a time difference between the left and the right decision time points TL and TR or by calculating a difference between controlled variables given to the first and the second variable delay circuits 4131 and 4132. A detection result in the control circuit 411 is delivered as the first and the second delay time control signals C1 and C2 to the first and the second variable delay circuits 4131 and 4132 and also to the processing circuit 42 (FIG. 1) as the internal control signal.

The eye aperture detection circuit 41 illustrated in FIG. 4 is supplied with the optimum threshold voltage Vth and clocks CLK from the CDR 30 having the function of adjusting the threshold voltage and detects the eye aperture of the intermediate data signal by using the optimum threshold voltage Vth and the clocks CLK.

Figure 7:
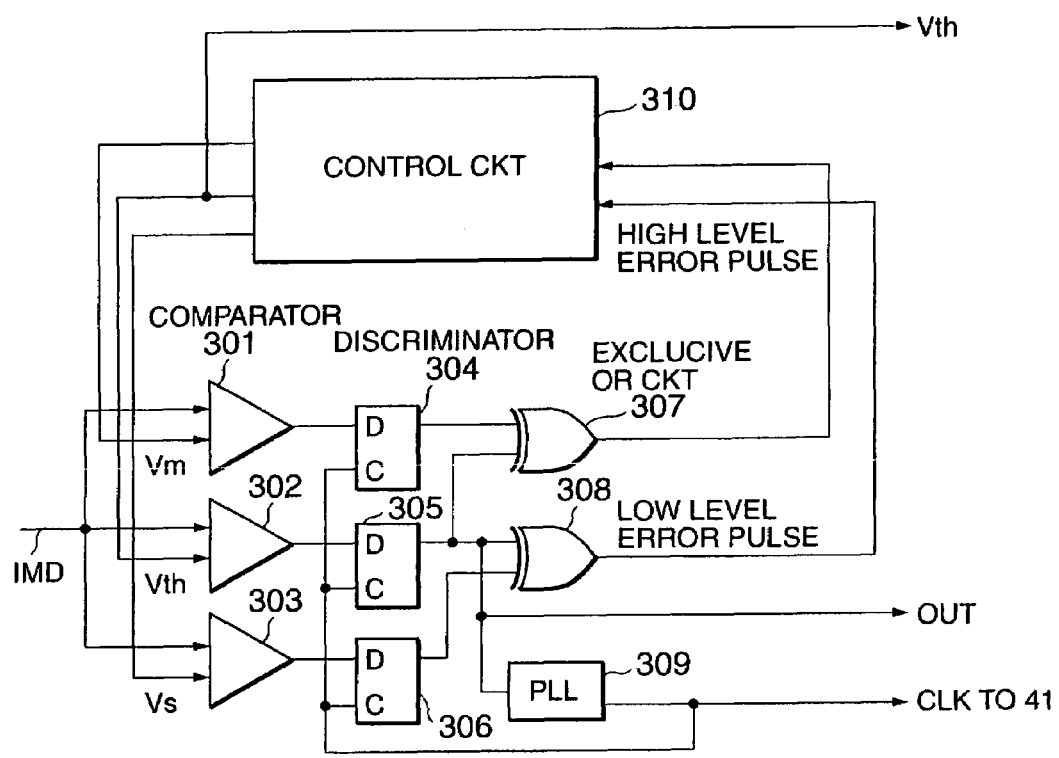
FIG. 7 is a block diagram of a code and data recovery circuit (CDR) which is applicable to the optical receiver illustrated in FIG. 1.

Referring to FIG. 7, exemplification will be made about a clock and data recovery circuit (CDR) 30 which is usable in the optical receiver illustrated in FIG. 1 and which has a function of adjusting the threshold voltage. The illustrated CDR 30 has three comparison units 301, 302, and 303, three discrimination units 304, 305, and 306, two Exclusive OR units 307 and 308, a PLL (phase locked loop) circuit 309, and a CDR control circuit 310.

The three comparison units 301 to 303 are given the intermediate data signal IMD from the waveform equalizer 20 in common and individually given a low discrimination level voltage Vs, a center discrimination level voltage Vth, and a high discrimination level voltage Vm, respectively. The low, the center, and the high discrimination level voltages Vs, Vth, and Vm are set to voltage levels adjacent to low level, center, and high levels of the intermediate data signals, respectively.

The illustrated Exclusive OR unit 307 is connected to both the discrimination units 304 and 305 and serves to detect whether or not regenerated results at the high and the center discrimination level voltages Vm and Vth are coincident with each other. On the other hand, the Exclusive OR unit 308 is connected to the discrimination units 305 and 306 and serves to detect whether or not regenerated results at the center and the low discrimination level voltages Vth and Vs are coincident with each other.

If noncoincidence is detected between the regenerated results at the high and the center discrimination level voltages Vm and Vth, a high (H) level error pulse is generated by the Exclusive OR unit 307 and is supplied to the CDR control circuit 310. Alternatively, if noncoincidence is detected between the regenerated results at the center and the low discrimination level voltages Vth and Vs, a low (L)

level error pulse is generated by the Exclusive OR unit 308 and is sent to the CDR control circuit 310.

The illustrated CDR control circuit 310 carries out control operation so as to detect a discrimination voltage (namely, the optimum threshold voltage) Vth such that each of the high and the low error pulses becomes a minimum in number. In addition, the regenerated result obtained by the discrimination unit 305 is produced as an output data signal OUT and is sent to an external circuit (not shown). Furthermore, the discrimination voltage Vth is delivered as the optimum threshold voltage together with the clocks to the eye aperture detection circuit 41. From this fact, it should be understood that the CDR 30 detects a variation of the eye pattern in the level direction (as shown in FIGS. 5 and 6) and outputs the optimum threshold level voltage Vth such that the variation in the level direction becomes a minimum.

Control Algorithm of the First Embodiment

Referring to FIGS. 8, 9, 10, and 11, description will be made about a control algorithm in the processing circuit 42 of the controller 40 illustrated in FIG. 1. The control algorithm may be called a first algorithm. Herein, it is surmised that the processing circuit 42 is supplied from the eye aperture detection circuit 41 with the first and the second delay time control signals C1 and C2 indicative of the left and the right decision time points TL and TR, as mentioned in conjunction with FIGS. 5 and 6. It is also assumed that the processing circuit 42 detects the eye aperture size along the time axis by calculating the difference between both the decision time points TL and TR.

To this end, the processing circuit 42 has an eye aperture calculation portion for calculating the eye aperture size from the first and the second delay time control signals C1 and C2. The processing circuit 42 further has a variable amplitude indicator portion for producing an amplitude adjustment signal so as to vary an output amplitude G of the variable gain amplifier 22 (FIG. 2) from an initial amplitude value. Specifically, the variable amplitude indicator portion serves to successively and stepwise vary the output amplitude G by a unit quantity ($\Delta G$) from the initial amplitude value. The unit quantity ($\Delta G$) may be simply called a unit quantity. Furthermore, an amplitude control portion is also included in the processing circuit 42 to produce a control signal to change the output amplitude G in response to the eye aperture size and the amplitude adjustment signal.

Alternatively, the processing circuit 42 may be implemented by a CPU operated by a software program and therefore, the above-mentioned operations of the processing circuit 42 may be executed by the software program. This applies to any other embodiments that will be described later.

Taking the above into consideration, a basic control algorithm of the processing circuit 42 will be described with reference to FIG. 8. For convenience of description, the output amplitude G of the variable gain amplifier 22 (FIG. 2) is directly concerned with operation of the processing circuit 42 in the following description. However, it is to be noted that the output amplitude G of the variable gain amplifier 22 is practically indirectly controlled by the internal control signal sent from the processing circuit 42.

Figure 8:
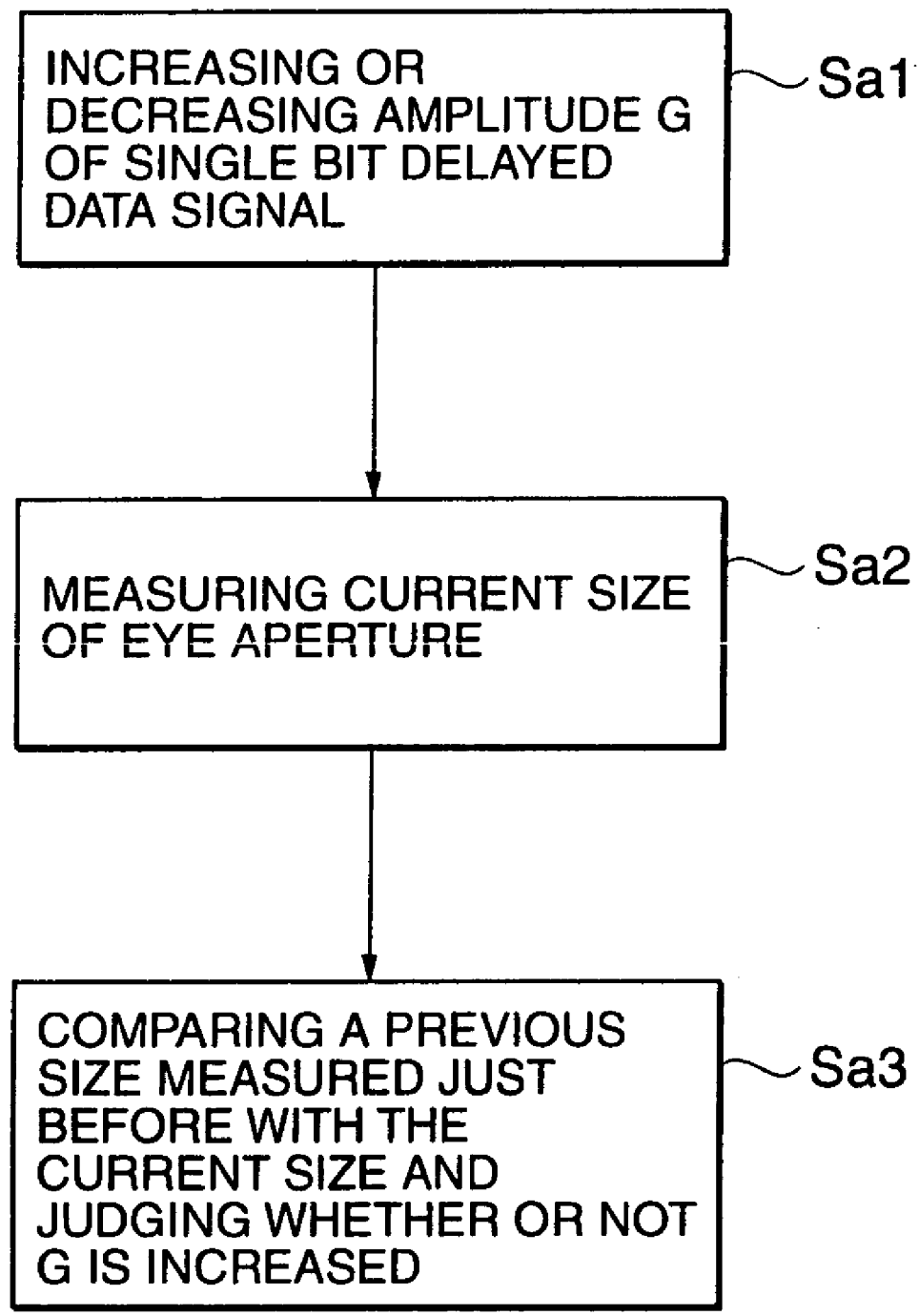
FIG. 8 shows a flow chart for use in schematically describing an operation of a processing circuit illustrated in FIG. 1.

As shown in FIG. 8, the processing circuit 42 executes a first step Sa1 to increase or decrease the amplitude G of the single bit delayed data signal from an initial value by the unit quantity ($\Delta G$). Practically, the single bit delayed data signal is given from the single bit delay circuit 21 to the variable gain amplifier 22 and is controlled in its amplitude by the variable gain indicator in the processing unit 42. To this end, the processing unit 22 supplies the variable gain amplifier 22 with the internal control signal indicative of an increase or a decrease of the amplitude of the single bit delayed data signal.

At a second step Sa2, the processing circuit 42 measures the eye aperture size as a current size by the use of the eye aperture calculation portion with reference to the first and the second delay time control signals C1 and C2. At a third step Sa3, the amplitude control portion of the processing circuit 42 compares an eye aperture size measured just before with the current size and judges whether or not the amplitude G of the variable gain amplifier 22 is increased.

Figure 9:
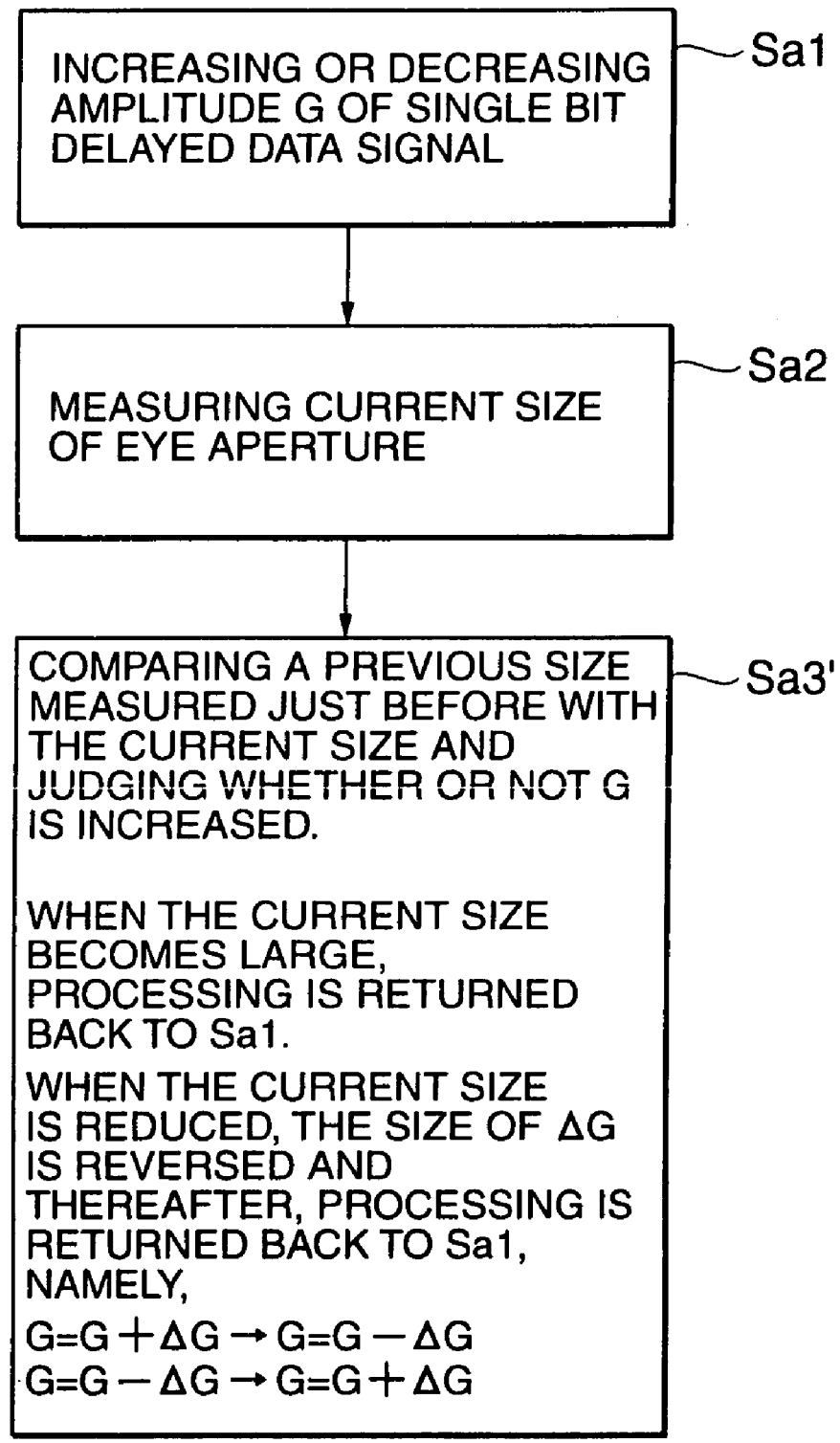
FIG. 9 shows a flow chart for describing a specific algorithm which is usable in the processing circuit illustrated in FIG. 1.

Referring to FIG. 9, the illustrated processing is similar to that shown in FIG. 8 except for the third step Sa3 and is therefore represented by a third step Sa3'. At the third step Sa3', when the previous size measured just before is compared with the current size and the eye aperture size becomes large, namely, is improved, the third step Sa3' is returned back to the first step Sa1. As a result, the amplitude G of the single bit delayed data signal is increased by $\Delta G$ and, thereafter, similar operation is repeated.

To the contrary, when the previous size measured just before is compared with the current size and the eye aperture size becomes small, namely, worse, a sign of the unit quantity ($\Delta G$) is reversed at the third step Sa3'. Specifically, when $\Delta G$ is positive, the sign of $\Delta G$ is changed to a negative sign and vice versa. Thereafter, the third step Sa3' is followed by the first step Sa1. If the amplitude G is increased by $+\Delta G$ at the first step Sa1 and the eye aperture size is reduced at the third step Sa3', the amplitude G is changed by $-\Delta G$ at the first step Sa1 and the eye aperture size is measured at the third step Sa3' to detect whether or not the eye aperture becomes large. At any rate, comparing the sizes of the eye apertures with each other is repeated until the eye aperture becomes small in size.

Thus, the above-mentioned algorithm is featured by changing the sign of the unit quantity ($\Delta G$) added to the single bit delayed data signal G when the eye aperture is reduced in size and by thereafter measuring the eye aperture size. It is to be noted that the processing illustrated in FIGS. 8 and 9 is executed in the amplitude control portion of the processing circuit 42.

Figure 10:
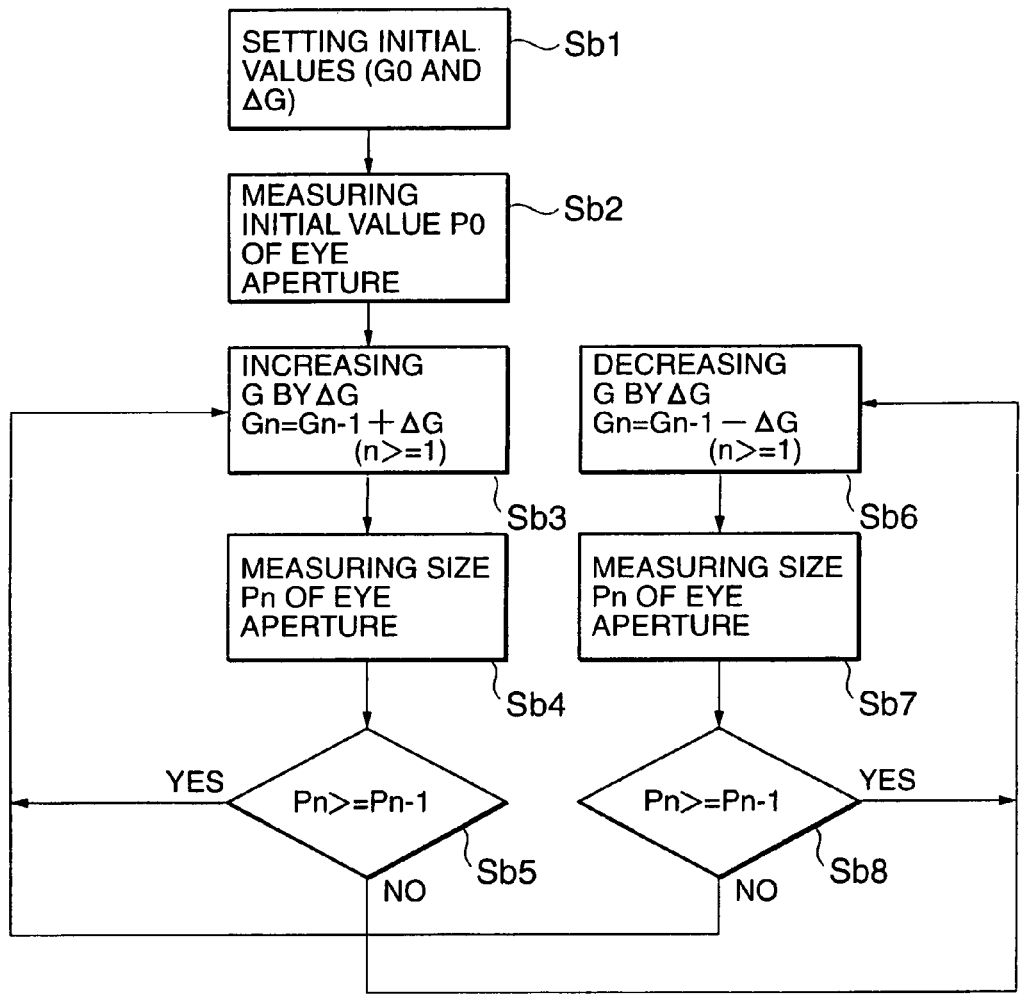
FIG. 10 shows a flow chart for describing operation according to the specific algorithm shown in FIG. 9.
Figure 11:
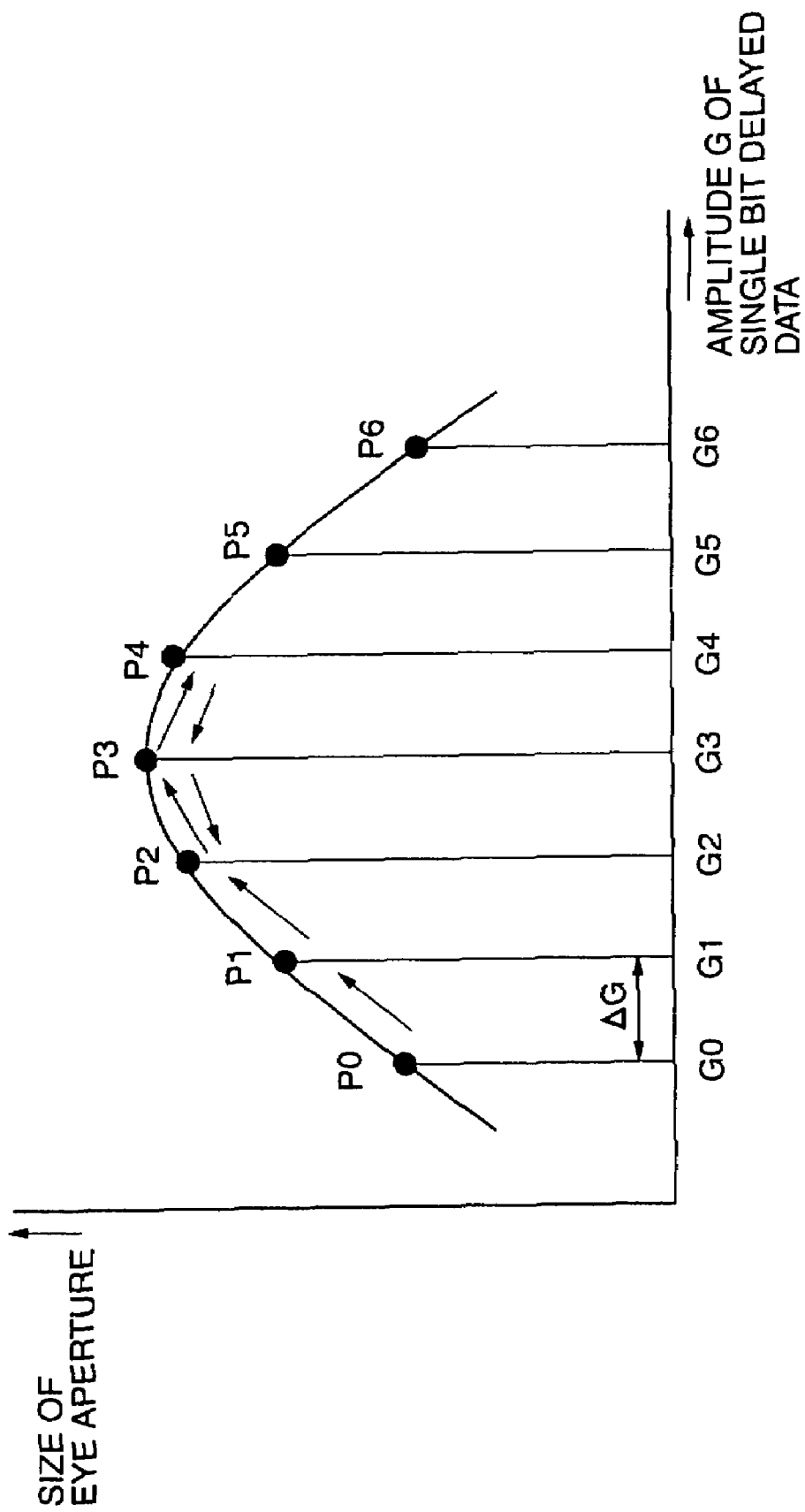
FIG. 11 shows a graphical representation for use in describing the operation illustrated in FIG. 10.

Referring to FIGS. 10 and 11, the processing executed by the processing circuit 42 will be described in detail. At first, it is assumed in FIGS. 10 and 11 that the processing is started from a minimum value G0 which the amplitude G of the single bit delayed data signal takes. In FIG. 10, a step Sb1 is carried out so as to set an initial value to G0 and to determine the unit quantity ($\Delta G$). The initial value G0 is representative of an initial amplitude G of the single bit delayed data signal while the unit quantity ($\Delta G$) is representative of an increment quantity increased after a single step is finished.

The step Sb1 is succeeded by a step Sb2 at which the eye aperture is measured along the time axis in connection with the single bit delayed data signal to determine an initial value P0 (FIG. 11) representative of an initial size value of the eye aperture. In the illustrated example, the processing circuit 42 measures or calculates the initial size value P0 on the basis of the first and the second delay time control signals C1 and C2. In this state, the amplitude G of the single bit delayed data signal is increased by ($\Delta G$) at a step Sb3 and, as a result, the amplitude G0 is increased to G1, as shown in FIG. 11. Next, an eye aperture size is measured at a step Sb4. In the example illustrated in FIG. 11, the eye aperture size is increased from the initial size P0 to a following size P1.

At a step Sb5, comparison is made between the initial or previous size P0 and the following current size P1 of the eye aperture. When the current size P1 is greater than the previous size P0, processing is returned back to the step Sb3 at which the amplitude is changed to G2=G1+ΔG and, thereafter, a next following size P2 of the eye aperture is measured as a following size at the step Sb4 and is compared with the previous size P1 at the step Sb5. As illustrated in FIG. 11, when P2 is greater than P1, the amplitude is changed to G3=G2+ΔG and a size P3 of the eye aperture is measured. Likewise, processing from the step Sb3 to the step Sb5 is repeated as long as the eye aperture size becomes large.

On the other hand, when it is judged at the step Sb5 that the eye aperture size P4 at G4 is smaller than the eye aperture size P3, as illustrated in FIG. 11, the following processing is moved to steps Sb6, Sb7, and Sb8 so as to successively and stepwise decrease the amplitude G from G4 to G3, and then from G3 to G2. When it is judged that the eye aperture size Pn is smaller than Pn−1 at the step Sb8, processing is returned back to the step Sb3.

In the example being illustrated in FIG. 11, when the amplitude is augmented from G3 to G4 and the eye aperture size is decreased from P3 to P4, the above-mentioned processing is moved from the step Sb5 to Sb6. As a result, the amplitude is reduced from G4 to G3 at the step Sb6 and, thereafter, comparison is made between the eye aperture sizes P4 and P3 at the step Sb8. As shown in FIG. 11, since P3 (Pn) is greater than P4(Pn−1), the step Sb8 is followed by the step Sb6 at which the amplitude is decreased from G3 to G2. The eye aperture size at G3 and G2 is measured at the step Sb7 and comparison is made between P3 (Pn−1) and P2 (Pn) at the step Sb8. Since P2 is smaller than P3 in FIG. 11, processing is moved from the step Sb8 to the step Sb3 at which the amplitude is increased from G2 to G3. Likewise, the amplitude is increased from G3 to G4 and is thereafter decreased from G4 to G3 and then from G3 to G2.

As a result, the amplitude G of the single bit delayed data signal is kept at a value adjacent to G3. Although the amplitude is changed from the initial value G0 in the above-mentioned example, processing may be started from any other amplitude, G6 or the like. In other words, similar results are accomplished whichever of the amplitudes are used as the initial amplitude.

As mentioned before, although the amplitude G of the single bit delayed data signal always moves or fluctuates among G2, G3, and G4, such fluctuation of the amplitude G is restricted to an extremely narrow range. Therefore, a variation of a signal-to-noise (S/N) ratio and the like can be substantially neglected which may arise from the fluctuation of the amplitude G. In addition, a time that is needed to be controlled from the initial value G0 to an optimum value G3 may be sufficiently long in comparison with a transmission rate of the intermediate data signal and may be a time interval of, for example, milliseconds.

Control Algorithm of Second Embodiment

Figure 12:
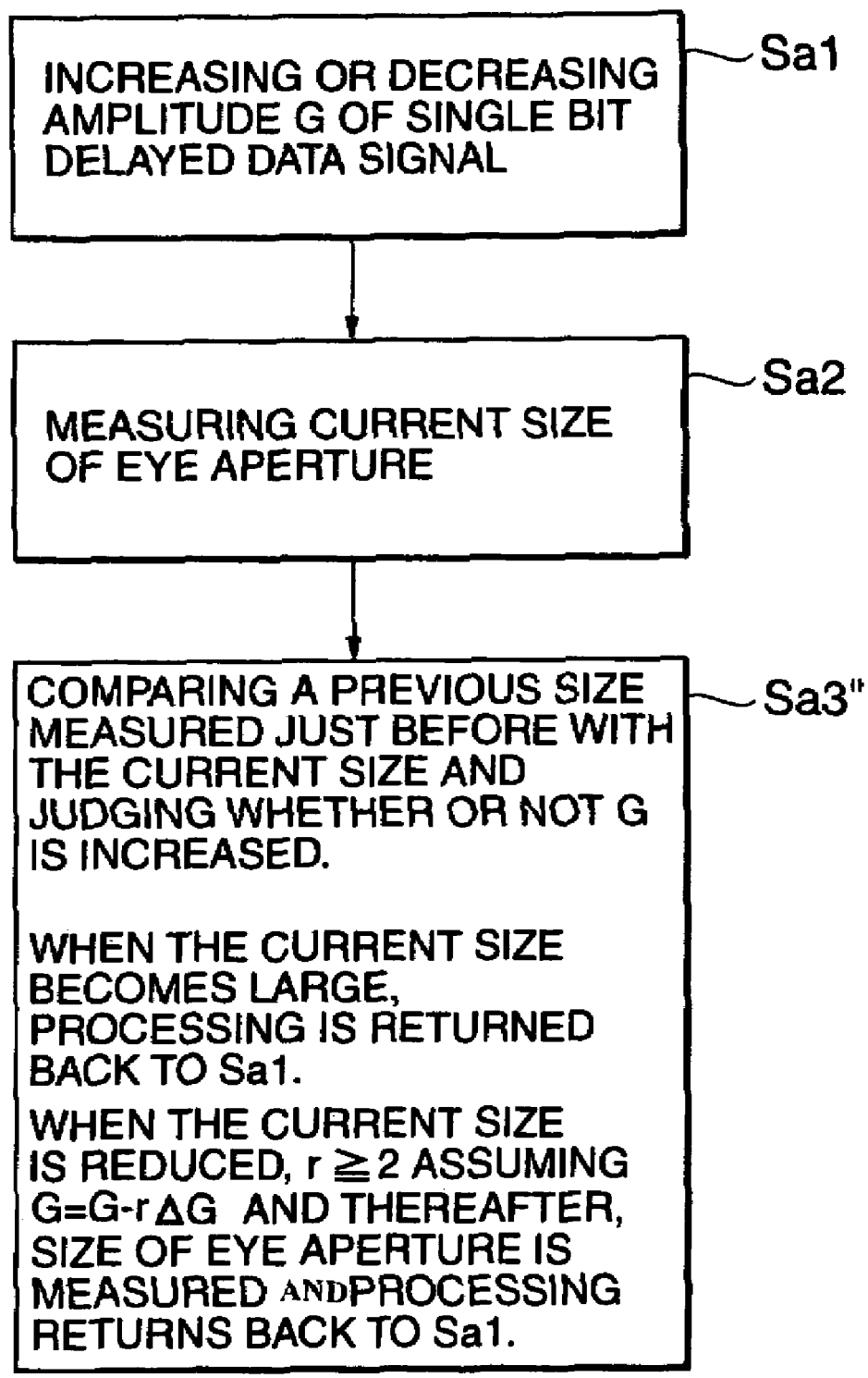
FIG. 12 shows a flow chart for describing another algorithm which is usable in the processing circuit illustrated in FIG. 1.
Figure 13:
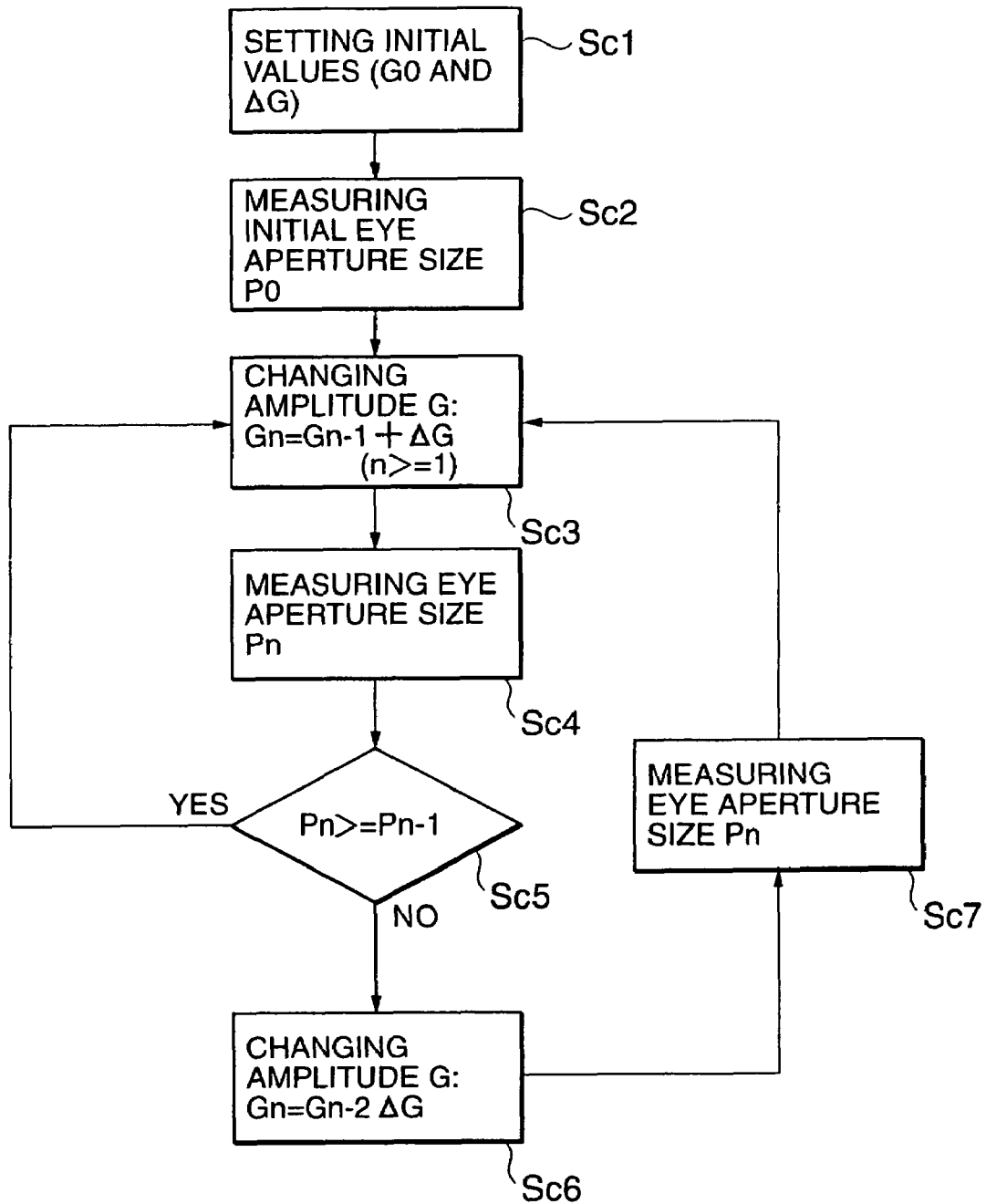
FIG. 13 shows a flow chart for describing operation according to the algorithm illustrated in FIG. 12.
Figure 14:
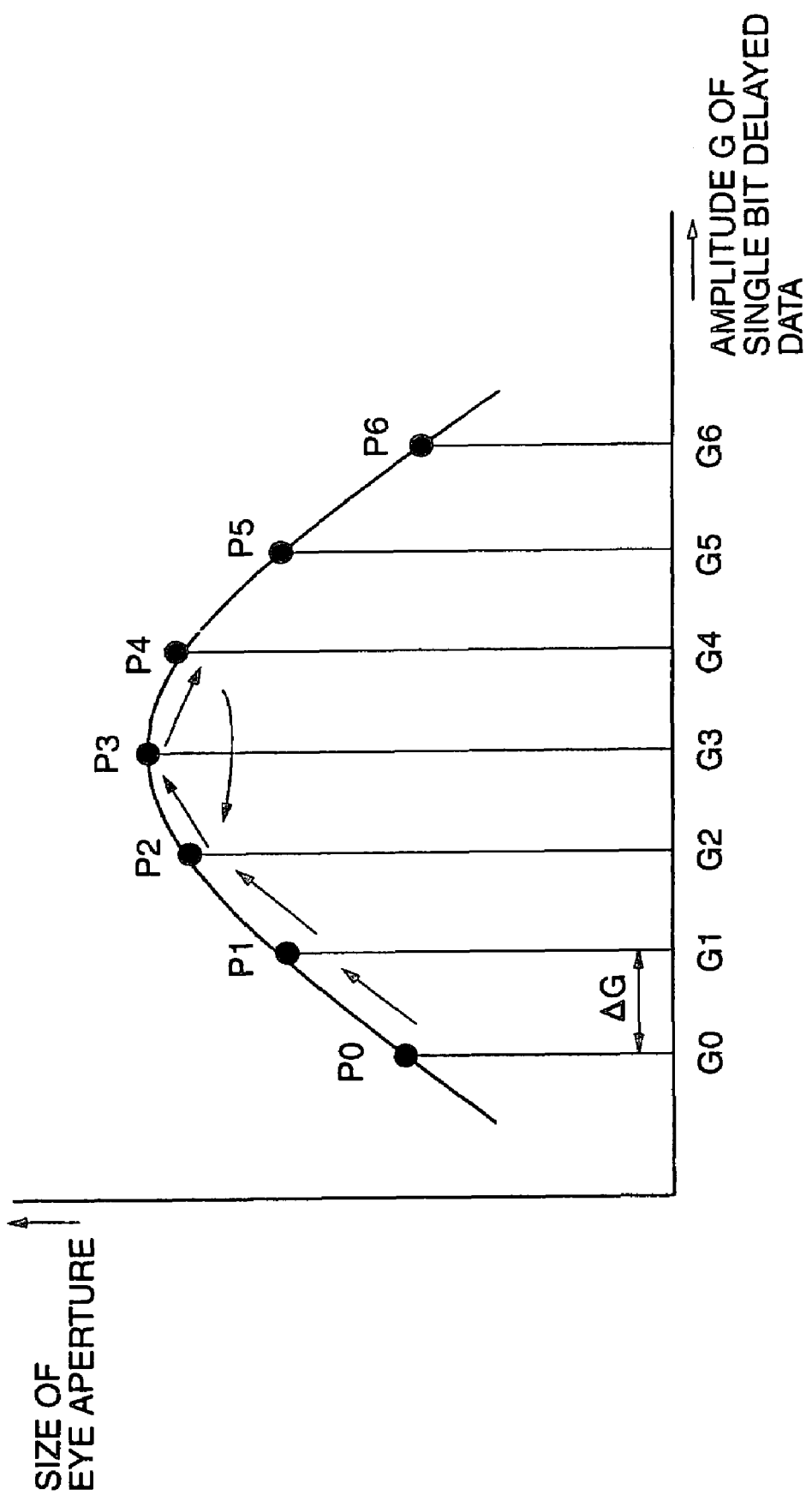
FIG. 14 shows a graphical representation for use in describing the operation illustrated in FIG. 13.

Referring to FIGS. 12, 13, and 14, description will be made about another algorithm that is used in an optical receiver according to a second embodiment of this invention and that may be called a second algorithm. The optical receiver operated according to the second algorithm has a processing circuit 42 that is somewhat different from that according to the first algorithm and that may be implemented by a software program. The algorithm of FIG. 12 is similar to that shown in FIG. 9 except that a step Sa3" is substituted for the step Sa3' in FIG. 9. The step Sa3" is for increasing or decreasing the amplitude G of the single bit delayed data signal on the basis of the comparison results of the eye aperture sizes in a manner different from FIG. 9.

Taking the above into account, the step Sa3" will be described in detail with reference to FIGS. 13 and 14 that show a detailed flow chart of the step Sa3" and a relationship between the amplitude G and the eye aperture size P, respectively.

Like in FIG. 9, the amplitude G of the single bit delayed data signal is stepwise increased by a unit quantity (ΔG) from an initial value of, for example, G0. With an increase (or improvement) of the eye aperture size, the amplitude G is further augmented by the unit quantity (ΔG). However, the illustrated algorithm is featured by processing that is carried out when an eye aperture size is reduced or becomes worse as a result of increasing the amplitude G by the unit quantity (ΔG). Specifically, the algorithm is specified by decreasing the amplitude G by a variation quantity (rΔG (r>=2)) that is defined for each step and that is greater than the unit quantity (ΔG) when the above-mentioned event takes place. Namely, the variation quantity (rΔG) is equal to plural times of the unit quantity (ΔG).

In the step Sa3" of FIG. 12, comparison is made between a previous eye aperture size measured just before current timing and a current eye aperture size measured at the current timing. In consequence, when the current eye aperture size is improved, namely, becomes large as compared with the previous eye aperture size, processing is returned back to the step Sa1 so as to augment the amplitude G by the unit quantity (ΔG) and is then repeated in a similar manner.

To the contrary, when the current eye aperture size becomes narrow as compared with the previous eye aperture size, the amplitude G is reduced by rΔG, as shown at the step Sa3" in FIG. 12. Thereafter, an eye aperture size is measured at the step Sa3" with the amplitude G reduced by rΔG and processing is returned by the step Sa1 and is repeated in a similar manner. Thus, the variation quantity of rΔG greater than ΔG is decreased from the amplitude G when the eye aperture size becomes worse. Decreasing rΔG is effective to simplify the step Sa1 because the amplitude G may be monotonically increased by ΔG at the step Sa1 after the variation quantity (rΔG) is decreased.

In the above-mentioned embodiment, description has been made on the assumption that the amplitude G is augmented from the initial or minimum value to a greater value. To the contrary, the amplitude G may be reduced from a maximum value to a smaller one. In this case, the amplitude G is decreased by the unit quantity ΔG each time when the eye aperture size becomes large and is improved. On the other hand, when the eye aperture size becomes worse or small, the amplitude G is augmented by rΔG. Like in FIG. 9, similar results can be accomplished whichever of the amplitude G is used as an initial value.

Referring to FIGS. 13 and 14 along with FIG. 12, the above-mentioned processing executed by the processing circuit 42 illustrated in FIG. 1 will be described more in detail. In FIG. 13, an initial amplitude G0 of the single bit delayed data signal and a unit quantity (ΔG) are set as initial values at a step Sc1 in FIG. 13. At a step Sc2, an eye aperture size is at first measured at the initial amplitude G0 and determined as an initial eye aperture size P0, as shown in FIG. 14. Subsequently, the amplitude G is increased by the unit quantity (ΔG) at a step Sc3. As a result, a previous amplitude Gn−1 is changed to a following amplitude Gn by adding the unit quantity (ΔG) to the previous amplitude Gn−1, as shown in FIG. 13. As is the case with the initial amplitude G0, it is changed at the step Sc3 to G1, as illustrated in FIG. 14.

The step Sc3 is followed by a step Sc4 at which an eye aperture size Pn is measured with the amplitude G kept at the following amplitude Gn. The measured eye aperture size Pn is compared with a previous eye aperture size Pn−1 at a step Sc5. For example, a following eye aperture size P1 is compared with the initial eye aperture size P0 at the step Sc5. If the following eye aperture size Pn is greater than the previous eye aperture size Pn−1, the processing is returned back to the step Sc3. In the example illustrated in FIG. 14, the following eye aperture size P1 is greater than the initial eye aperture size P0. Therefore, the step Sc5 is succeeded by the step Sc3 at which the amplitude G is changed from G1 to G2 by adding the unit quantity (ΔG) to G1. At the step Sc4, a next eye aperture size P3 is measured with the amplitude G kept at G2. Thereafter, similar operation is repeated so as to approach the amplitude G to an optimum value.

In the example illustrated in FIG. 14, an eye aperture size P4 measured at an amplitude G4 is decreased in comparison with an eye aperture size P3 measured at an amplitude G3. This shows that the amplitude G4 is remote from an optimum value or amplitude. When the following eye aperture size Pn becomes smaller than the previous eye aperture size Pn−1, the step Sc5 is followed by a step Sc6 at which the amplitude G is varied by rΔG, where r is equal to two in the example illustrated in FIGS. 13 and 14. In FIGS. 13 and 14, the amplitude G is varied by (G4−2ΔG) when it is increased to G4. As a result, the amplitude G4 is decreased to G2. In this situation, the step Sc6 is succeeded by a step Sc7 at which an eye aperture size is measured to obtain P2. After the measurement of the eye aperture size P2, processing is returned back to the step Sc3 to increase the amplitude G by the unit quantity (ΔG). In the illustrated example, the amplitude G is augmented to G3 at the step Sc3 which is succeeded by the steps Sc4 and Sc5 to measure an eye aperture size P3 and to compare P3 with P2.

As a result, the amplitude G is successively changed in the order of G0, G1, G2, G3 (optimum value), G4, G2, G3 (optimum value), G4, G2, . . . . This shows that the amplitude G can be always controlled within a narrow region adjacent to the optimum value G3. Like in FIG. 11, the initial amplitude may be selected at an optional amplitude value. For example, let the initial amplitude be selected in FIG. 15 at G6 that is greater than G3. In this event, the amplitude G is decreased from G6 successively by the unit quantity (ΔG) each time when an eye aperture size is improved, namely, becomes large. Specifically, the amplitude G is successively varied in the order of G6, G5, G4, and G3, because the eye aperture size becomes gradually wide as a decrease of the amplitude G. However, when G3 is changed to G2, the eye aperture size is reduced in FIG. 14 from P3 to P2. Therefore, when the amplitude G reaches to G2, it is changed to G4 by adding (2ΔG) to G2. Thus, processing is repeated among G4, G3, and G2 and the amplitude G is always kept at a region adjacent to the optimum amplitude G3.

As mentioned in conjunction with FIGS. 11 and 14, the processing carried out in accordance with the first and the second algorithms makes it possible to maximize the eye aperture size by detecting the time difference between two decision time points located along the time axis. In other words, this processing serves to control the amplitude of the single bit delayed data signal sent from the single bit delay circuit 21 through the variable gain amplifier 22 and also serves to remove the cross talk components in the manner illustrated in FIG. 3.

The optical receiver according to this invention is advantageous in that the light signal can be always discriminated in an optimum state because control operation is executed such that the eye aperture size becomes a maximum.

While this invention has thus far been described in conjunction with several embodiments thereof, it will be readily possible for those skilled in the art to put this invention into practice in various other manners. For example, although the above-description has been restricted to the optical receiver alone, this invention is applicable to any other receiver that can receive a data signal forming an eye pattern. In addition, the eye aperture detection circuit 41 can be applied to any other receivers than the optical receiver.

What is claimed is:

1. An optical receiver operable in response to a light signal and comprising:
    a clock and data recovery circuit (CDR) for recovering a sequence of clocks and a sequence of data signals in response to an intermediate data signal obtained from the light signal, with reference to a threshold control signal used for recovering the data signal sequence;
    a controller, responsive to the intermediate data signal and the threshold control signal, for detecting an eye pattern of the intermediate data signal that includes an eye aperture to control an eye aperture size; and
    a waveform equalizer, responsive to an electric signal converted from the light signal and an internal control signal, for reshaping a waveform of the electric signal into a waveform-shaped signal in accordance with the internal control signal to supply the waveform-shaped signal to the clock and data recovery circuit as the intermediate data input signal,
    wherein said waveform equalizer comprises:
        a single bit delay circuit that delays the electric signal by one bit;
        a variable gain amplifier that controls an amplitude of the delayed electric signal in response to the internal control signal from the controller; and
        a subtracter that subtracts the amplitude controlled and delayed electric signal, which is received from the variable gain amplifier, from the electric signal converted from the light signal.

2. An optical receiver as claimed in claim 1, further comprising:
    a photoelectric converter for converting the light signal sequence into the electric signal,
    the controller producing an eye control signal for controlling the eye aperture size and supplying the waveform equalizer with the eye control signal as the internal control signal.

3. An optical receiver as claimed in claim 1, wherein the clock and data recovery circuit (CDR) includes a function of recovering the data signal sequence at a threshold level which is adjusted to an optimum level and which is produced as the threshold control signal.

4. An optical receiver operable in response to a light signal and comprising:
    a clock and data recovery circuit (CDR) for recovering a sequence of clocks and a sequence of data signals in response to an intermediate data signal obtained from the light signal, with reference to a threshold control signal used for recovering the data signal sequence;

a controller, responsive to the intermediate data signal and the threshold control signal, for detecting an eye pattern of the intermediate data signal that includes an eye aperture to control an eye aperture size; and a waveform equalizer, responsive to an electric signal converted from the light signal and an internal control signal, for reshaping a waveform of the electric signal into a waveform-shaped signal in accordance with the internal control signal to supply the waveform-shaped signal to the clock and data recovery circuit as the intermediate data input signal, wherein said waveform equalizer comprises:
  a single bit delay circuit that delays the electric signal by one bit; and
  a variable gain amplifier that controls an amplitude of the delayed electric signal in response to the internal control signal from the controller, wherein the controller comprises:
  an eye aperture detection circuit, responsive to the intermediate data signal and the threshold control signal, for detecting the eye aperture size to produce a result of detection as a detection signal representative of the result of detection; and
  a processing circuit for processing the detection signal to supply the eye control signal as the internal control signal to the waveform equalizer so that the eye aperture is widened along a time axis.

5. An optical receiver as claimed in claim 4, wherein the eye aperture detection circuit comprises:
  a level adjustment circuit for adjusting the threshold control signal into a reference level signal; and
  a decision circuit for discriminating the eye aperture size on the basis of the reference level signal at a first decision time point and at second and third decision time points preceding and following the first decision time point, respectively, to produce first through third ones of the results of detection at the first through the third decision time points as the detection signal.

6. An optical receiver as claimed in claim 4, wherein the processing circuit controls the eye aperture size in accordance with an algorithm that defines a relationship between each amplitude of the intermediate data signal and the eye aperture size.

7. An optical receiver operable in response to a light signal and comprising:
  a clock and data recovery circuit (CDR) for recovering a sequence of clocks and a sequence of data signals in response to an intermediate data signal obtained from the light signal, with reference to a threshold control signal used for recovering the data signal sequence;
  a controller, responsive to the intermediate data signal and the threshold control signal, for detecting an eye pattern of the intermediate data signal that includes an eye aperture to control an eye aperture size;
  a photoelectric converter for converting the light signal sequence into an electric signal; and
  a waveform equalizer, responsive to the electric signal and an internal control signal, for reshaping a waveform of the electric signal into a waveform-shaped signal in accordance with the internal control signal to supply the waveform-shaped signal to the clock and data recovery circuit as the intermediate data input signal;
  the controller producing an eye control signal for controlling the eye aperture size and supplying the waveform equalizer with the eye control signal as the internal control signal, wherein the controller comprises:
  an eye aperture detection circuit, responsive to the intermediate data signal and the threshold control signal, for detecting the eye aperture size to produce a result of detection as a detection signal representative of the result of detection; and
  a processing circuit for processing the detection signal to supply the eye controls signal as the internal control signal to the waveform equalizer so that the eye aperture is widened along a time axis,
  wherein the processing circuit controls the eye aperture size in accordance with an algorithm that defines a relationship between each amplitude of the intermediate data signal and the eye aperture size,
  wherein the algorithm uses a variation of the eye aperture size that appears when an amplitude of a single bit delayed data signal is varied by a unit quantity.

8. An optical receiver as claimed in claim 7, wherein the algorithm determines an amplitude position corresponding to a maximum one of the eye aperture size, with reference to the variation of the eye aperture size appearing when the amplitude is varied by a unit quantity.

9. An optical receiver as claimed in claim 8, wherein the algorithm is such that the amplitude position corresponding to the maximum eye aperture size is determined by successively varying the amplitude by the unit quantity.

10. An optical receiver as claimed in claim 8, wherein the algorithm is such that, when the eye aperture size is changed from an increase to a decrease, the amplitude is changed by a variation quantity greater than the unit quantity to be returned back to a previous amplitude and is then varied by the unit quantity.

11. An optical receiver as claimed in claim 8, wherein the algorithm is such that, when the eye aperture size is changed from an increase to a decrease, the unit quantity that is indicative of the variation quantity of the amplitude is inverted in polarity.

12. A receiver responsive to a sequence of data signals specified by an eye pattern to produce a sequence of output data signals representative of reproductions of the data signals, comprising:
  an eye aperture detection circuit for detecting an eye aperture size in the eye pattern from the data signal sequence to produce a detection signal representative of a result of detection;
  a processing circuit for processing the detection signal to produce a control signal for controlling the eye aperture size; and
  a waveform equalizer including a single bit delay circuit that delays the data signal sequence by one bit and a variable gain amplifier that controls an amplitude of the delayed data signal sequence in response to the control signal from the processing circuit,
  wherein said waveform equalizer further includes a subtracter that subtracts the amplitude controlled and delayed data signal sequence, which is received from the variable gain amplifier, from the data signal sequence.

13. A receiver responsive to a sequence of data signals specified by an eye pattern to produce a sequence of output data signals representative of reproductions of the data signals, comprising:
  an eye aperture detection circuit for detecting an eye aperture size in the eye pattern from the data signal sequence to produce a detection signal representative of a result of detection;

a processing circuit for processing the detection signal to produce a control signal for controlling the eye aperture size; and a waveform equalizer for reshaping the data signal sequence into a sequence of waveform-shaped signals to supply the wave-formed shaped signals to the eye aperture detection circuit;

the control signal being supplied from the control circuit to the waveform equalizer as an internal control signal while the waveform equalizer delays the data signal sequence in response to the internal control signal and shapes the data signal sequence, wherein the waveform equalizer comprises:

a delay circuit for delaying the data signal sequence by a single bit to produce a sequence of single bit delayed data signals;

a variable gain amplifier, responsive to the single bit delayed data signals and the internal control signal, for controlling a gain in accordance with the internal control signal to produce a sequence of gain controlled data signals; and a subtracter for subtracting the gain controlled data signal sequence from the data signal sequence.

14. A receiver as claimed in claim 13, wherein the eye aperture detection circuit comprises:

regenerating means, which includes a plurality of decision time points arranged at time points different from one another along a time axis, for regenerating whether or not each decision time point is located within the eye aperture to produce regenerated results at the respective decision time points;

a control circuit for controlling time positions of the decision time points in response to the regenerated results.

15. A receiver as claimed in claim 14, wherein the regenerating means includes, as the decision time points, a center time point to be placed along the time axis at a center of the eye aperture and two time points preceding and following the center time point;

the control circuit producing delay control signals for controlling the time positions of the two time points preceding and following the center time point in response to the regenerated results.

16. A receiver as claimed in claim 15, wherein the regenerating means comprises:

variable delay time means, responsive to the delay control signal, for varying delay times of clocks to produce delayed clocks;

a plurality of discriminators for regenerating the data signals at the decision time points determined by the clocks and the delayed clocks to produce regenerated signals representative of the regenerated results to supply the regenerated signals with the processing circuit.

17. A receiver as claimed in claim 15, wherein the processing circuit is supplied as the regenerated results with time delay control signals and processes the time delay control signals in accordance with a predetermined algorithm to produce the control signal such that the eye aperture size of the data signals becomes a maximum.

18. A receiver as claimed in claim 17, wherein the predetermined algorithm utilizes a variation of the eye aperture size that appears when the amplitude of the single bit delayed data signals are varied by a unit quantity.

19. A receiver as claimed in claim 18, wherein the predetermined algorithm determines an amplitude position of a maximum eye aperture size from a variation of the eye aperture size corresponding to a variation of the unit quantity of the amplitude.

20. A receiver as claimed in claim 19, wherein the predetermined algorithm is such that the maximum amplitude position of the eye aperture size is calculated by successively varying the amplitude by the unit quantity.

21. A receiver as claimed in claim 19, wherein the predetermined algorithm is such that, when the eye aperture size is changed from an increase to a decrease, the amplitude is changed by a variation quantity greater than the unit quantity to be returned back to a previous amplitude and is then varied by the unit quantity.

22. A receiver as claimed in claim 19, wherein the algorithm is such that, when the eye aperture size is changed from an increase to a decrease, the unit quantity that is indicative of the variation quantity of the amplitude is inverted in polarity.

23. An eye aperture detection circuit operable in response to a sequence of data signals specified by an eye pattern, comprising:

a receiving circuit for receiving the data signal sequence; and an eye aperture size detector for detecting an eye aperture size of the eye pattern along a time axis in response to the data signal sequence received by the receiving circuit, wherein the data signal sequence received by the receiving circuit is delayed by one bit and amplified in response to an internal control signal to produce a delayed and amplified data signal sequence, and wherein said delayed and amplified data signal sequence is subtracted from said data signal sequence.

24. An eye aperture detection circuit operable in response to a sequence of data signals specified by an eye pattern, comprising:

a receiving circuit for receiving the data signal sequence; and an eye aperture size detector for detecting an eye aperture size of the eye pattern along a time axis in response to the data signal sequence received by the receiving circuit, wherein the data signal sequence received by the receiving circuit is delayed by one bit and amplified in response to an internal control signal, wherein the eye aperture detector comprises:

a discriminator, responsive to the data signal sequence and clocks synchronized with the data signal sequence, for regenerating the data signal sequence at time points of the clocks to produce first regenerated results;

a pair of discriminators for regenerating the data signal sequence at time points preceding and following those of the clocks to produce second and third regenerated results, respectively;

a logical circuit for carrying out logical operation of the first through the third regenerated results given from the above-mentioned discriminators to produce logical operation results; and a control circuit for detecting the eye aperture size in response to the logical operation results.

25. An eye aperture detection circuit as claimed in claim 24, wherein the control circuit produces time delay control signals corresponding to time positions adjacent to edges of the eye aperture.

26. An eye aperture detection circuit as claimed in claim 25, wherein the eye aperture detector further comprises:

variable delay circuits for delaying the clocks in response to the time delay control signals.

27. A method of receiving a sequence of data signals specified by an eye pattern, comprising:
    stepwise varying an amplitude of the data signal sequence by a unit quantity in a selected one of an increase direction and a decrease direction;
    successively detecting an eye aperture size of the eye pattern at each amplitude varied; and
    controlling the eye aperture size so as to maximize the same.

28. A method as claimed in claim 27, wherein the eye aperture size controlling comprises:
    detecting a reduction of the eye aperture size while the amplitude is varied in the selected direction; and
    changing the selected direction to a reverse direction on detection of the reduction of the eye aperture, to thereby control the eye aperture size so that it becomes a maximum.

29. A method as claimed in claim 27, wherein the eye aperture size controlling comprises:
    detecting a reduction of the eye aperture size while the amplitude is varied in the selected direction;
    changing the amplitude by plural times of the unit quantity in a direction reverse to the selected direction, on detection of the reduction of the eye aperture; and
    then monotonically and stepwise changing the amplitude by the unit quantity in the selected direction so that the eye aperture size becomes a maximum.

30. A method as claimed in claim 27, wherein said eye aperture size is controlled so as to maximize the same along a time axis.

31. A method as claimed in claim 27, wherein said eye aperture size is controlled so that it becomes the maximum along a time axis.

32. A method as claimed in claim 27, wherein said amplitude is monotonically and stepwise changed so that the eye aperture size becomes the maximum along a time axis.

33. A computer-readable medium tangibly embodying a program of recordable, machine-readable instructions executable by a digital processing apparatus to perform a method of causing a receiver to receive a sequence of data signals specified by an eye pattern, the method comprising:
    stepwise varying an amplitude of the data signal sequence by a unit quantity in a selected one of an increase direction and a decrease direction;
    successively detecting an eye aperture size of the eye pattern at each amplitude varied; and
    controlling the eye aperture size so as to maximize the same.

34. The computer-readable medium as claimed in claim 33, wherein the eye aperture size controlling comprises:
    detecting a reduction of the eye aperture size while the amplitude is varied in the selected direction; and
    changing the selected direction to a reverse direction on detection of the reduction of the eye aperture, to thereby control the eye aperture size so that it becomes a maximum.

35. The computer-readable medium as claimed in claim 33, wherein the eye aperture size controlling comprises:
    detecting a reduction of the eye aperture size while the amplitude is varied in the selected direction;
    changing the amplitude by plural times of the unit quantity in a direction reverse to the selcted direction, on detection of the reduction of the eye aperture; and
    then monotonically and stepwise changing the amplitude by the unit quantity in the selected direction so that the eye aperture size becomes a maximum.

36. The computer-readable medium according to claim 33, wherein said eye aperture size is controlled so as to maximize the same along a time axis.

* * * * *